United States Patent
G Rao et al.

(10) Patent No.: US 11,436,535 B2
(45) Date of Patent: Sep. 6, 2022

(54) ARTIFICIAL INTELLIGENCE BASED APPLICATION TESTING AND SCORING

(71) Applicant: ACCENTURE GLOBAL SOLUTIONS LIMITED, Dublin (IE)

(72) Inventors: Srikanth G Rao, Bangalore (IN); Tarun Singhal, Bangalore (IN); Mathangi Sandilya, Bangalore (IN); Avishek Gulshan, Bangalore (IN); Saisandeep Sanku, Bangalore (IN); Arunabh Sinha, Bangalore (IN); Jayaprakash Nooji Shekar, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 302 days.

(21) Appl. No.: 16/901,483

(22) Filed: Jun. 15, 2020

(65) Prior Publication Data
US 2021/0342742 A1 Nov. 4, 2021

(30) Foreign Application Priority Data
May 1, 2020 (IN) .............................. 202011018728

(51) Int. Cl.
*G06F 21/00* (2013.01)
*G06N 20/00* (2019.01)
*G06F 21/57* (2013.01)

(52) U.S. Cl.
CPC ............. *G06N 20/00* (2019.01); *G06F 21/57* (2013.01)

(58) Field of Classification Search
CPC ........ G06N 20/00; G06N 3/0454; G06N 3/08; G06F 21/57
See application file for complete search history.

(56) References Cited

U.S. PATENT DOCUMENTS

| 10,133,980 B2 * | 11/2018 | Turner ................... G06N 7/005 |
| 2009/0089869 A1 * | 4/2009 | Varghese .............. G06F 21/566 726/7 |
| 2013/0097706 A1 | 4/2013 | Titonis et al. |
| 2016/0112451 A1 * | 4/2016 | Jevans ................... G06F 21/56 726/25 |

(Continued)

FOREIGN PATENT DOCUMENTS

WO 2016/054384 A1 4/2016

*Primary Examiner* — John B King
(74) *Attorney, Agent, or Firm* — Mannava & Kang, P.C.

(57) ABSTRACT

A dynamic application testing and scoring system that tests applications under various tenets and categorizes the applications to be published, to be further reviewed or rejected. The results from administering a plurality of tests to an application are analyzed by applying rulesets that pertain to criteria under each of the tenets. An application score is determined from the analysis using weights associated with the tenets, priority levels of the criteria and the severity levels of the rulesets. The application score identifies a position for the application on a scoring scale relative to two trust threshold values. The application is categorized based on the position. Feedback regarding the categorization is received and the trust threshold values on the scoring scale can be adjusted if the categorization in the feedback is different from the categorization produced by the scoring system.

19 Claims, 15 Drawing Sheets

(56) References Cited

U.S. PATENT DOCUMENTS

| | | | |
|---|---|---|---|
| 2016/0127367 A1* | 5/2016 | Jevans | H04W 12/10 |
| | | | 713/152 |
| 2017/0286830 A1* | 10/2017 | El-Yaniv | G06N 3/0454 |
| 2019/0156191 A1* | 5/2019 | Cordes | G06N 3/08 |
| 2019/0197244 A1 | 6/2019 | Fong | |
| 2019/0197357 A1* | 6/2019 | Anderson | G06N 3/08 |
| 2020/0159917 A1* | 5/2020 | Cervantez | G06N 20/00 |
| 2020/0174774 A1* | 6/2020 | Natarajan | G06F 8/65 |
| 2020/0322346 A1* | 10/2020 | Van Rensburg | H04L 63/104 |
| 2021/0012115 A1* | 1/2021 | Bodbyl | G08B 21/0261 |
| 2021/0097168 A1* | 4/2021 | Patel | G06F 21/566 |
| 2021/0149658 A1* | 5/2021 | Cannon | G06N 3/04 |
| 2021/0241279 A1* | 8/2021 | Patten, Jr. | G06F 17/15 |

* cited by examiner

FIG. 13

ARTIFICIAL INTELLIGENCE BASED APPLICATION TESTING AND SCORING

PRIORITY

The present application claims priority under 35 U.S.C. 119(a)-(d) to Indian Non-Provisional Patent Application number 202011018728, having a filing date of May 1, 2020, the disclosure of which is hereby incorporated by reference in its entirety.

BACKGROUND

Digital distribution or electronic software distribution (ESD) is the digital distribution of content such as digitized music, digital books (E-books), games or software. This term represents distribution of the content over an online delivery medium such as the Internet as opposed to physical distribution methods. The online content can be streamed or downloaded. Streaming includes distribution of live content or providing content on demand while downloading the content entirely to a device storage which enables the user to permanently own the content and consume the content at will. The content that is distributed needs to be compliant not only with the devices, hardware and software but also with the policies of digital distribution platforms. Accordingly, the digital distribution platforms need to test the various applications that are published on the platforms in order to determine that the purveyors of the content are following the policies in place while generating the content for digital distribution on the platforms.

BRIEF DESCRIPTION OF DRAWINGS

Features of the present disclosure are illustrated by way of examples shown in the following figures. In the following figures, like numerals indicate like elements, in which:

FIG. 13 shows an approval notification and a rejection notification generated in accordance with the examples disclosed herein.

DETAILED DESCRIPTION

Figure 1:
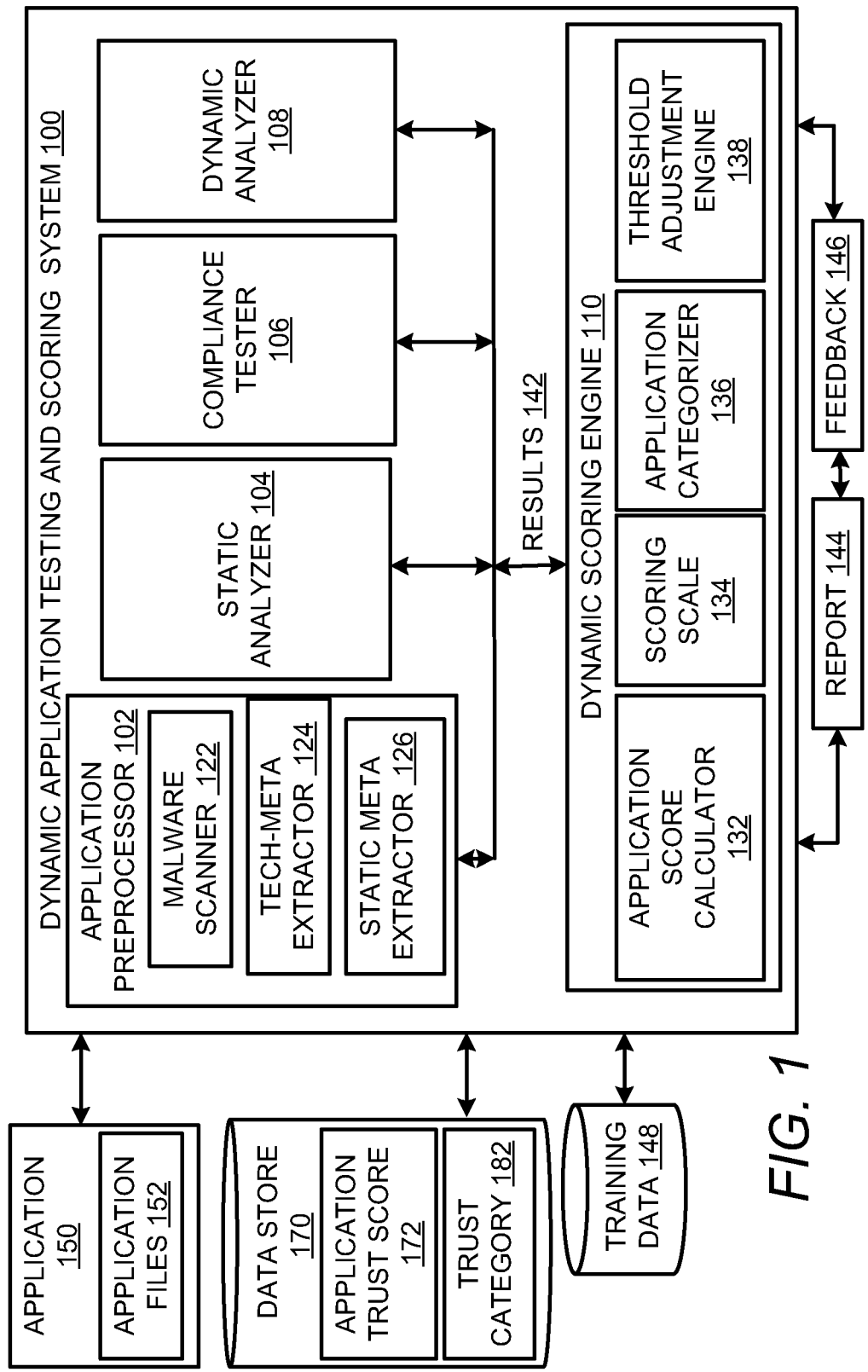
FIG. 1 shows a block diagram of a dynamic testing and scoring system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A dynamic application testing and scoring system that categorizes applications into a plurality of trust categories thereby enabling automatic determination of the application as eligible or ineligible for publication on a digital publication platform is disclosed. The application can include a software program that is used to execute a specific function such as a financial application, an ecommerce application, a gaming application or even a health monitoring application, etc. A plurality of tests test the application under a plurality of tenets which include security, compliance, compatibility and performance. Each of the tenets is associated with one or more criteria or standards that determine the extent to which the application upholds the various tenets. Each criterion in turn is defined by one or more rulesets that are applicable to results generated by administering a plurality of tests to the application.

Based on a classification of the application into a functional class of multiple functional classes, the different tenets may be assigned different degrees of importance or multiplicative factors by the scoring system. Accordingly, different criteria are applied and hence different rulesets are selected to be applied to the results of the plurality of tests. The criteria also carry different multiplicative factors referred to as priority levels and the different rulesets under a given criterion can carry different severity levels. Depending on the functional class of the application, the overall quality of the application can be determined based on performance of the application in different tests under each of the tenets. A 360 degree application trust score that is indicative of the overall performance of the application under the different tenets is calculated based at least on the results which are analyzed using the rulesets and that are further weighed using the degrees of importance of the tenets, the priority levels of the criteria and the severity levels of the rulesets.

The application trust score is used to identify a position for the application on a scoring scale that is formed from a graduated range of values starting from a minimum application trust score to a maximum application trust score. The scoring scale further includes two trust threshold values the positions of which can be dynamically varied on the scoring scale. The pair of trust threshold values can include a lower trust threshold value and an upper trust threshold value. The trust threshold values are calculated using the number of rulesets applied to the application under the tenets and the severity levels of the rulesets. More particularly, the lower trust threshold value is based on a number of the rulesets and a lower limit of absolute weightage of the rulesets and the upper trust threshold value is based on the number of rulesets and an upper limit of absolute weightage of the rulesets wherein the absolute weightage of the rulesets is a cumulative quantity including the degrees of importance of the tenets, the priority levels of criteria under the tenets and the severity levels of the rulesets.

The positions of the lower trust threshold value and the upper trust threshold value divide the scoring scale into three portions with each portion covering one particular range of application trust scores on the scoring scale and the portions being indicative of the categorization of the application by the scoring system into one of a plurality of trust categories which can include safe, potentially vulnerable and vulnerable categories. The position of the application on the scoring scale as indicated by the application trust score falls into one of the three portions. If the application is positioned above the upper trust threshold value on the scoring scale the application is categorized as 'safe'. If the application is positioned below the upper trust threshold value and the lower trust threshold value on the scoring scale then the application is categorized as potentially vulnerable. If the application is positioned below the lower trust threshold value on the scoring scale then the application is categorized as vulnerable.

In an example, the categorization produced by the scoring system may be manually validated by human reviewers who may or may not validate the categorization produced by the scoring system. If a human reviewer validates the categorization produced by the scoring system i.e., the reviewer agrees with or provides the same categorization as the scoring system, then an automatic action can be executed upon validation. If the application is categorized as safe, then the application can be automatically uploaded to a publication database or play store wherein it can be accessed by the users of a specific operating system or mobile platform. If the application is categorized as potentially vulnerable, then the application is categorized for further analysis and development. The results of the plurality of tests may be shared in a report with the concerned parties, e.g., the purveyors of the application as suggestions for development. If the application is categorized as vulnerable, then the application is rejected as ineligible for publication.

If the reviewer does not agree with the categorization produced by the scoring system, the reviewer provides a different categorization to the application in the validation data or feedback. Accordingly, a mismatch exists between the determinations made by the scoring system regarding the application being eligible for publication (safe), categorized for further development (potentially vulnerable) or rejection (vulnerable) and the corresponding inputs in the feedback. In an example, the categorization can be provided for manual validation prior to being communicated to the application developers. The dynamic attribute of the scoring system enables automatically changing the trust threshold values of the scoring scale so that the application is positioned in a region on the scoring scale in accordance with the categorization provided by the reviewer in the validation data. The changes to the trust threshold values indicate that the corresponding severity levels of the rulesets need to be altered as the trust threshold values are varied due to the inputs from the validation data. In an example, a feed forward neural network is employed to adjust the severity levels of the rulesets. The feed forward neural network is trained on historical data for adjusting the severity threshold. In an example, the historical data includes determinations regarding categorizations for a plurality of applications into one of the plurality of trust categories produced by the dynamic application testing and scoring system and validation data including feedback corresponding to those determinations from human reviewers for the plurality of applications. The feed forward neural network tries different variations in severity levels for each ruleset that is applied to the application. The different severity levels are those which are applied to the same ruleset for another application which can have the same categorization as the application in the validation data. The severity levels of the other application having similar categorization as the application are identified and applied to the ruleset. Thus, the severity levels of different rulesets are automatically adjusted.

The dynamic application testing and scoring system as disclosed herein provides for a technical improvement to a technical problem in the field of application testing and publication wherein the applications are tested in silos and there is no single consolidated procedure wherein the application is tested for different tenets. Furthermore, the tests that are administered in silos are only able to identify weaknesses or vulnerabilities of the application pertaining to that tenet. However, such tests do not provide a comprehensive estimate of the overall performance of the application. Additionally, individual tests may only convey how the application performed with respect to that tenet regardless of how important the tenet is for the functioning of the application in the real-world. For example, the security tenet may be more important for a financial application than a compatibility tenet. Accordingly, developers of the application may have given greater importance to security than to compatibility. On the other hand, a compatibility tenet can be more important than security tenet for a gaming application. However, individual tests administered separately to test security and compatibility aspects of the application cannot provide a performance measure of the application that reflects such trade-offs. The scoring system as disclosed herein is able to provide a 360 degree estimation of the execution of the application under different tenets by not only assigning a degree of importance to each of the tenets with respect to the application but also by taking into consideration the priority levels of criteria under the tenets and the severity levels of the rulesets under each of the criteria. Such weightages enable assessing performance of the applications more accurately as the test results are estimated in view of the above-mentioned choices made during the application development. Also, the dynamic adjustment of trust thresholds and severity levels enable the scoring system to adopt a proactive approach to handle certain dynamic situations which may emerge such as #metoo movement or blue whale gaming. The policies and hence the thresholds are dynamically tweaked on periodic basis (e.g., daily or weekly basis) to allow a flexible, proactive monitoring and administration of applications on a digital publication platform.

FIG. 1 shows a block diagram of a dynamic testing and scoring system 100 that administers tests, determines quality of an application 150, such as a mobile application, and enables publication of the applications to various platforms in accordance with the examples disclosed herein. Example platforms can include but are not limited to, Apple® App Store, Amazon® Alexa, Google® Play, SAP® store etc. The scoring system 100 includes an application preprocessor 102, a static analyzer 104, a compliance tester 106, a dynamic analyzer 108 and a dynamic scoring engine 110. The system 100 analyzes the application files 152 which may be compiled into the application 150 or an "app" and uploaded to the various platforms to be accessed by users of mobile devices. Various application files such as the executable files, image files, data files, manifests, plugins, etc. may be provided via an input user interface (not shown) to the scoring system 100 as part of the application upload. In an example, the scoring system 100 can be coupled to a data store 170 to store the application files 152 and other data values that are used during the testing and scoring processes execution by the scoring system 100.

The application preprocessor 102 does a preliminary scan of the application files 152 by a malware scanner 122 for determining that the application 150 does not carry any malware. If it is determined that the application 150 includes malware, then the application 150 may be rejected and a notification can be automatically sent out to the concerned parties regarding presence of malware and the consequent rejection of the application 150 for publication. If the application 150 is cleared by the malware scanner 122, the tech-meta extractor 124 and the static-meta extractor 126 extract the technical metadata and the static metadata respectively of the application 150. The technical metadata can include the software and hardware requirements of the application 150 and other technical features while the static metadata can include the static text, images and other static data included as part of the application files 152. The static analyzer 104 is configured for testing the security features of the application 150. In an example, the static analyzer 104 may test the source code files of the application line-by-line to examine the application code for security vulnerabilities. By way of illustration and not limitation, tools such as Mobile Security Framework (MOBSF) which is an automated, all-in-one mobile application (Android/iOS®/Windows®) for pen-testing, malware analysis and security assessment framework capable of performing static and dynamic analysis may be employed by the application preprocessor 102. The compliance tester 106 tests the application 150 for static meta compliance. The static images obtained from the application files 152 by the static-meta extractor 126 are processed by various ML models such as convolution neural networks (CNNs) for object recognition and image classification. Such data can be employed by the dynamic scoring engine 110 for detection of objectionable content. The dynamic analyzer 108 tests the application files for device compatibility with various hardware and software combinations that may be present in different devices. Different standardized tools such as Amazon Web Services (AWS®) Device Farm can be employed for testing compatibility.

The results 142 from the various tests run by the application preprocessor 102, the static analyzer 104, the compliance tester 106 and the dynamic analyzer 108 are provided to the dynamic scoring engine 110 for scoring the application 150 on the various tenets and releasing the application to various platforms or rejecting the application 150 from publication based on the generated scores. The dynamic scoring engine 110 includes an application score calculator 132, a scoring scale 134, an application categorizer 136 and a threshold adjustment engine 138. The application score calculator 132 is configured to obtain an application trust score 172 which is based on the different tenets, their weightage or degree of importance to the application 150. The application trust score 172 is therefore a 360 degree score that is generated by multi-facet scoring policies employed by the scoring system 100 and is indicative of the performance under the various tenets.

These tenets include compliance, security, performance and compatibility. The compliance tenet deals with the legal and regulatory aspect of applications. For example, the compliance tenet can cover enforcement of privacy laws of a geographic locale where the application 150 is made available. There is a growing body of legislation and regulations globally across industries such as the General Data Privacy Regulations (GDPR) of European Union (EU). These legislations are becoming more pervasive, more consequential and more complex. Skilled resources to ensure regulatory compliance across the complex domestic and international frameworks are scarce. There are currently more than 2.5 million requests per year to comply with law enforcement and content take-down requirements and this number is growing annually at a double-digit rate. Hence, a dynamic framework such as the scoring system 100 as described herein which can execute automatic actions and auto-adjust thresholds as required enables digital publishers to better comply with such requests.

The security tenet is an important, multi-dimensional problem for various platforms. Developers use the platforms in a variety of ways, inspiring innovation but malicious usage can lead to the erosion of trust, quality and safety. While security needs to be integrated with the application development lifecycle from day one, there is no way digital publication platforms such as App Stores can control that for apps submitted by unknown parties. Remediation services (e.g. security & privacy risk assessment, fuzz testing, pen testing etc.) are required for such existing applications to help manage threats.

The performance tenet is vital for the application 150 to gain and keep users. The quality of apps published on an App Store is important to drive user adoption. All apps are not the same in terms of performance expectations—as mentioned earlier, a gaming app requires more resources (CPU, memory etc.) compared to a Productivity app. If App Stores can dynamically test the performance of submitted apps by third parties across an extensive range of real mobile devices before publishing, they would be able to give recommendations on optimizing app performance for target devices and eventually improve monetization through controlled publishing of well targeted and performant apps.

The compatibility tenet is also important for increased user adoption of the application 150. Given the plethora of mobile devices available, it is necessary to ascertain if an app is compatible with a particular mobile device. Several factors such as changing form factor, model, operating system (OS) versions and types, configuration etc. need to be considered in order to have an optimal app usage experience on a mobile device. An App Store would be concerned if the listed apps are actually playing well on the popular user devices. Hence there is a need to test apps against a collection of real devices at scale and find out compatibility issues to fix.

Each of the tenets carry different weights based on a classification of the application into one of multiple functional classes and the degree of importance of the tenet is factored into the scoring methodology. For example, for a financial application, the security and compliance tenets can carry higher importance as compared to tenets such as performance and/or compatibility. On the other hand, the compatibility and performance tenets may carry greater importance for gaming and entertainment applications as compared to the compliance or security tenets. Furthermore, the tenets are linked to the tests administered to the application 150 through different criteria. Therefore, each tenet is associated with multiple criteria to determine if the application 150 meets the requirements associated with that tenet. In an example, the performance tenet can be linked to the corresponding test via a RAM utilization criterion. Various rulesets are utilized for further determination regarding whether the application 150 meets the criterion. For example, the determination regarding whether the application 150 has met or failed to meet the RAM utilization criterion is made based on a rule within one or more rulesets associated with the RAM utilization criterion. Similarly, in another example, if the application 150 is a financial app but includes unsecured ciphers, or MD5 algorithms, then the application 150 can be identified as failing to meet a security criteria as it does not comply with a rule that forbids an application from using MD5 algorithms. The application score calculator 132 therefore applies various rulesets to the results 142 to determine if the application 150 meets the criteria under a given tenet. The application 150 receives a score for each rule that is met under each of the criteria associated with a given tenet. The score is multiplied based on the severity of the rule, the priority level of the criteria and the weightage that the tenet carries for that trust category.

The application trust score 172 thus obtained is used to identify a position or rank for the application 150 on the scoring scale 134. The scoring scale 134 includes a range of values that the application trust score 172 can assume starting from a minimum value to a maximum value that can be assigned to the application trust score 172. In addition, the scoring scale 134 includes two threshold values—a lower trust threshold value and an upper trust threshold value that delineate the scores into three trust categories. Based on the application trust score 172, the application 150 is classified by the application categorizer 136 into a trust category 182 of the three trust categories—vulnerable, potentially vulnerable and safe. If the application trust score 172 is less that the lower trust threshold value, the application 150 is categorized as vulnerable. If the value of the application trust score is between the lower trust threshold value and the upper trust threshold value the application is categorized as potentially vulnerable. If the application trust score 172 is greater than the upper trust threshold value, the application 150 is categorized as safe. Based on the trust category 182 of the application 150 different automatic actions can be executed. If the application is categorized as vulnerable, the application 150 can be rejected from being published and a notification can be sent to the responsible parties regarding the rejection. Alternately the parties responsible for the application 150 can be notified about the rejection or the trust score 172. If the application 150 is categorized as potentially vulnerable, the application 150 is prevented from being published or made available to public databases for download. A notification regarding the potentially vulnerable status of the application 150 and optionally the results 172 are shared with a responsible party so that the responsible party may address the vulnerabilities and re-upload the application 150 to the scoring system 100 for evaluation. If the application 150 is categorized as safe, the application 150 can be directly provided to publication databases from where it can be made available to public for download via mobile platforms such as play stores executed by mobile operating systems on mobile devices. The scoring system 100 can also include output interfaces such as user interfaces for administrators/reviewers for executing various functions as detailed herein.

In an example, one or more of the results 142, the application trust score 172 and the trust category 182 can be provided for validation to a human reviewer, via a report 144. The reviewer can study the report 144 and may either confirm the output of the scoring system 100 or the review may make changes to one or more of the results 142, the application trust score 172 and the trust category 182. The changes made by the reviewer can be provided as feedback 146 to the scoring system 100. The feedback 146 which is received over a certain time period can be employed to automatically update one or more of the rulesets, the components that makeup the application trust score 172, the lower and upper trust threshold values and thereby the trust category 182 of the application. In an example, the threshold adjustment engine 138 can be trained on training data 148 to adjust the various values in response to the feedback 146. Therefore, the scoring system 100 tends to be dynamic in that the scoring system 100 is able to factor in changes to policies, updates in software or improvements to hardware, introduction of newer devices, etc.

Figure 2:
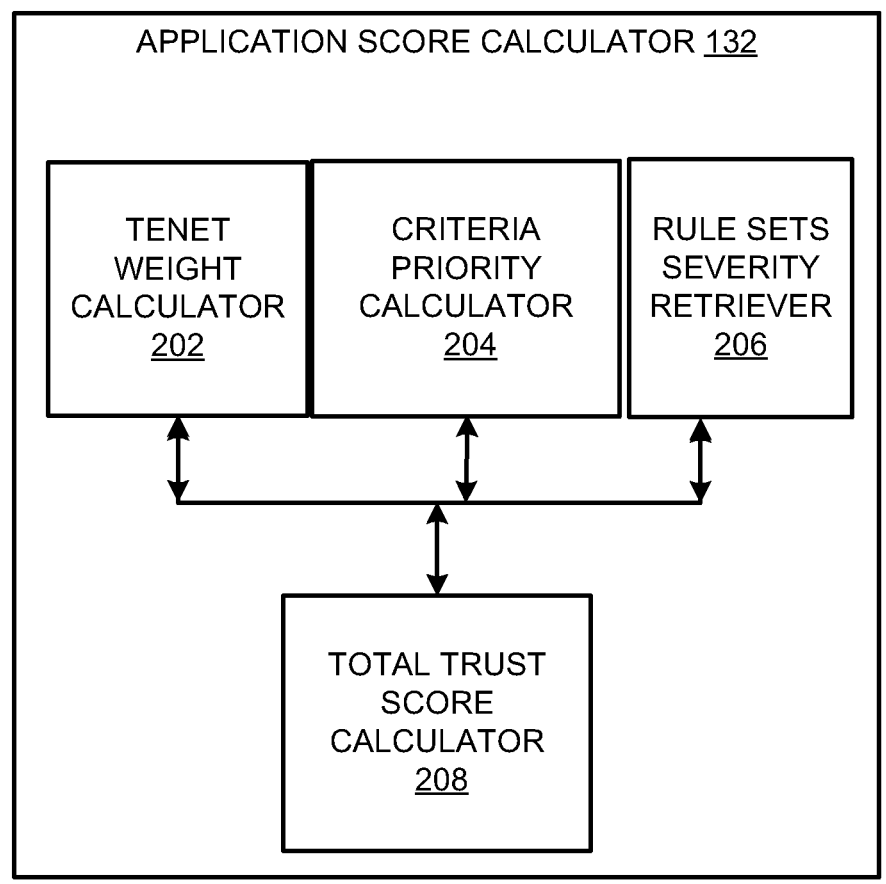
FIG. 2 shows a detailed diagram of an application score calculator in accordance with the examples disclosed herein.

FIG. 2 shows a detailed diagram of the application score calculator 132 in accordance with the examples disclosed herein. The application score calculator 132 obtains the application trust score 172 based on three factors that include the tenets, the criteria and the rule sets. Therefore, the application trust score 172 includes components pertaining to the three factors. The tenet weight calculator 202 obtains a component of the application trust score 172 pertaining to the tenets. Tenet describes an independent and isolated entity which is of importance for developing public trust for an organization. Each tenet can be associated with a degree of importance defined as $T_iD_i$. In an example, each tenet can have the same degree of importance. In an example, each tenet may have a different degree of importance as compared to another tenet based on the functional class of an application. As mentioned above, the security tenet and compliance tenet may have higher degree of importance as compared to performance tenet or compatibility tenet for an application which implies that the value of $D_i$ for security and compliance tenets may be higher than the value of $D_i$ for performance of compatibility tenets. The different weights associated with each of the tenets for a given class of application can be preconfigured within the tenet weight calculator 202. The data regarding the type or class of application being tested and scored can be obtained from metadata extracted from the application files 152 e.g., application manifests. The tenet weight calculator 202 therefore outputs a weighted term each for each of the tenets.

A criterion is a condition set by the tenet ($T_i$) that needs to be fulfilled by an application for it to be approved against that tenet. Each criterion carries a priority level (e.g., low (L), medium (M) and high (H)) with weightages such as $T_iC_iPW_L$, $T_iC_iPW_M$ and $T_iC_iPW_H$. Furthermore, each criterion can be associated with multiple rule sets. In an example, each criterion under a given tenet can have the same priority level. In an example, different criterion under one tenet can have different priority levels. The criteria priority calculator 204 obtains the values for the weightages which take into consideration the degree of importance of the tenet as well as the priority level of the criterion.

Rulesets are different version of criteria based on the functional classes of the applications and severity levels or devices in scenarios where devices may be involved. Each ruleset has associated severity level (e.g., low (L), medium (M) and high (H)) with varied weightages such as $T_iR_iW_L$, $T_iR_iW_M$, $T_iR_iW_H$, respectively. Again, the severity levels can correspond to numerical values which can be preconfigured within the ruleset severity retriever 206 and used for calculating the application trust score 172. In an example, each ruleset therefore has a unique weightage which can be preconfigured based on the type of application.

The inputs from each of the tenet weight calculator 202, criteria priority calculator 204 and rulesets severity retriever 206 are provided to the application trust score calculator 208. The application trust score calculator 208 outputs the application trust score as:

$$\text{Application trust score} = \sum_{m=0}^{m1}\left(T_mD_m\left(\sum_{x=0}^{x1}\left(T_mC_xPW_{\{L,M,H\}}\left(\sum_{y=0}^{y1}T_mR_yW_{\{L,M,H\}}/y1\right)\right)\middle/ \times 1\right)\right)/m1 \quad \text{Eq. (1)}$$

where:

$X$=CIEL (Median of all absolute weightages of rule sets configured in system)$-n$     Eq. (2)

$Y$=CIEL(Median of all absolute weightages of rule sets configured in system)$+n$     Eq. (3)

y1=Count of enabled rulesets in a particular criterion,
x1=Count of the enabled criteria in a tenet,
m1=Count of the tenets, and
n is the buffer value and decides the range of grey list area wherein larger values of n imply greater grey list area which is the range of flexibility for varying the threshold values. The X and Y values mentioned above in Eq. (1) refer to values used to define and arrive at lower and upper thresholds on the absolute classification threshold scale. The application trust score obtained above from Eq. (1) is indicative of the extent to which the application 150 can be trusted when installed in a user's device in the context of the tenets configured. Higher the value of the application trust score 172, higher will be the trust. Conversely, lower the value of the application trust score, lower will be the trust.

Figure 3:
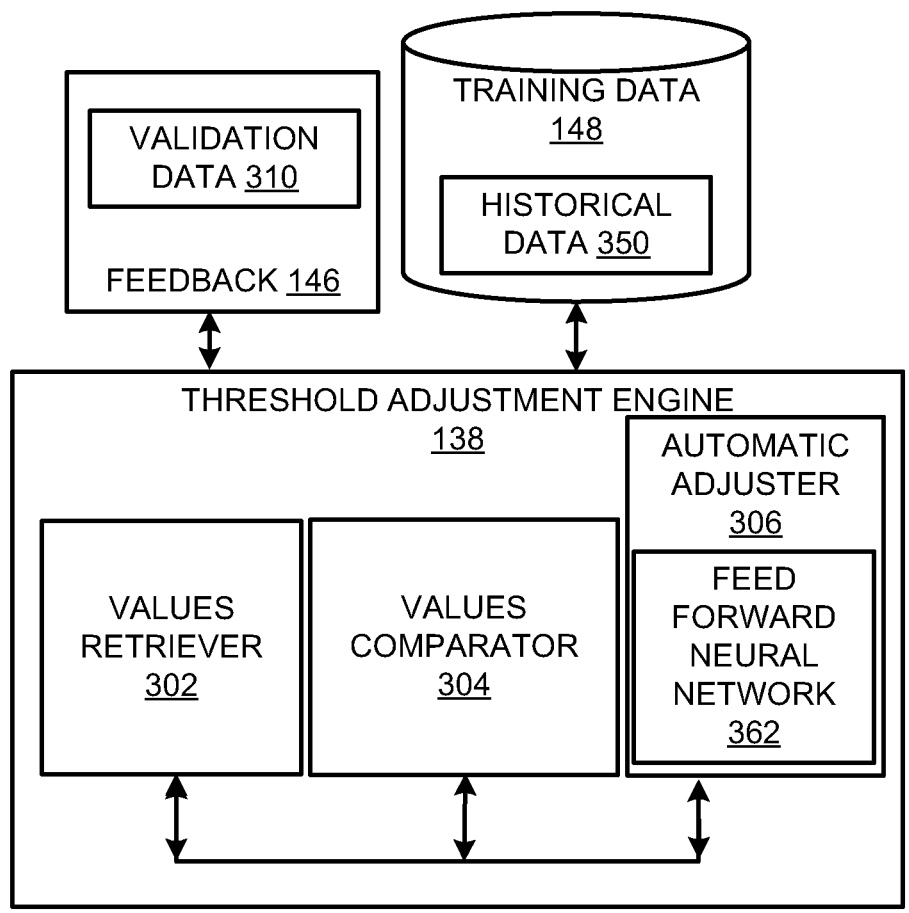
FIG. 3 shows a block diagram of a threshold adjustment engine in accordance with the examples disclosed herein.

FIG. 3 shows a block diagram of the threshold adjustment engine 138 in accordance with the examples disclosed herein. The threshold adjustment engine 138 includes a values retriever 302, a values comparator 304 and an automatic adjuster 306. The values retriever 302 can be configured to access the report 144 which can include one or more of the results 142, the application trust score 172, the trust category 182, and the feedback 146. The validation data 310 can include a confirmation of the various outputs from the scoring system 100 by the reviewer in one example. In another example, the validation data 310 can include changes or updates provided to one or more of the results 142, the application trust score 172 and the trust threshold values by the reviewer.

The values comparator 304 compares the values obtained from the scoring system 100 with the corresponding values from validation data 310 provided by the reviewer. The feedback 146 can include values from the scoring system 100 that match the values from the validation data 310 and the values from the scoring system 100 that were changed by the reviewer in the validation data 310 and hence do not match the corresponding values in the validation data 310.

The values comparator 304 identifies values from the feedback 146 that do not match the values that were generated by the scoring system 100. The automatic adjuster 306 includes ML components such as a feed forward neural network 362 that is trained via supervised training on historical data 350 to automatically adjust one or more of the priority of the criteria, the severity of the associated rulesets and the lower and upper trust threshold values based on the feedback 146. The historical data 350 can include the categorizations produced by the scoring system 100 for the previously-scored applications and the corresponding categorizations provided by the reviewer for the previously-scored applications.

In an example, the automatic adjuster 306 may cache the mismatches identified in the feedback 146 and when the mismatches exceed a predetermined limit, the automatic adjuster 306 can adjust one or more of the priority of the criteria, the severity of the associated rulesets and the lower and upper trust threshold values so that the values output by the scoring system 100 match those received in the validation data 310. Therefore, the scoring system 100 is dynamically updateable to reflect the changing scenarios associated with the applications without requiring explicit tuning from human users.

Figure 4A:
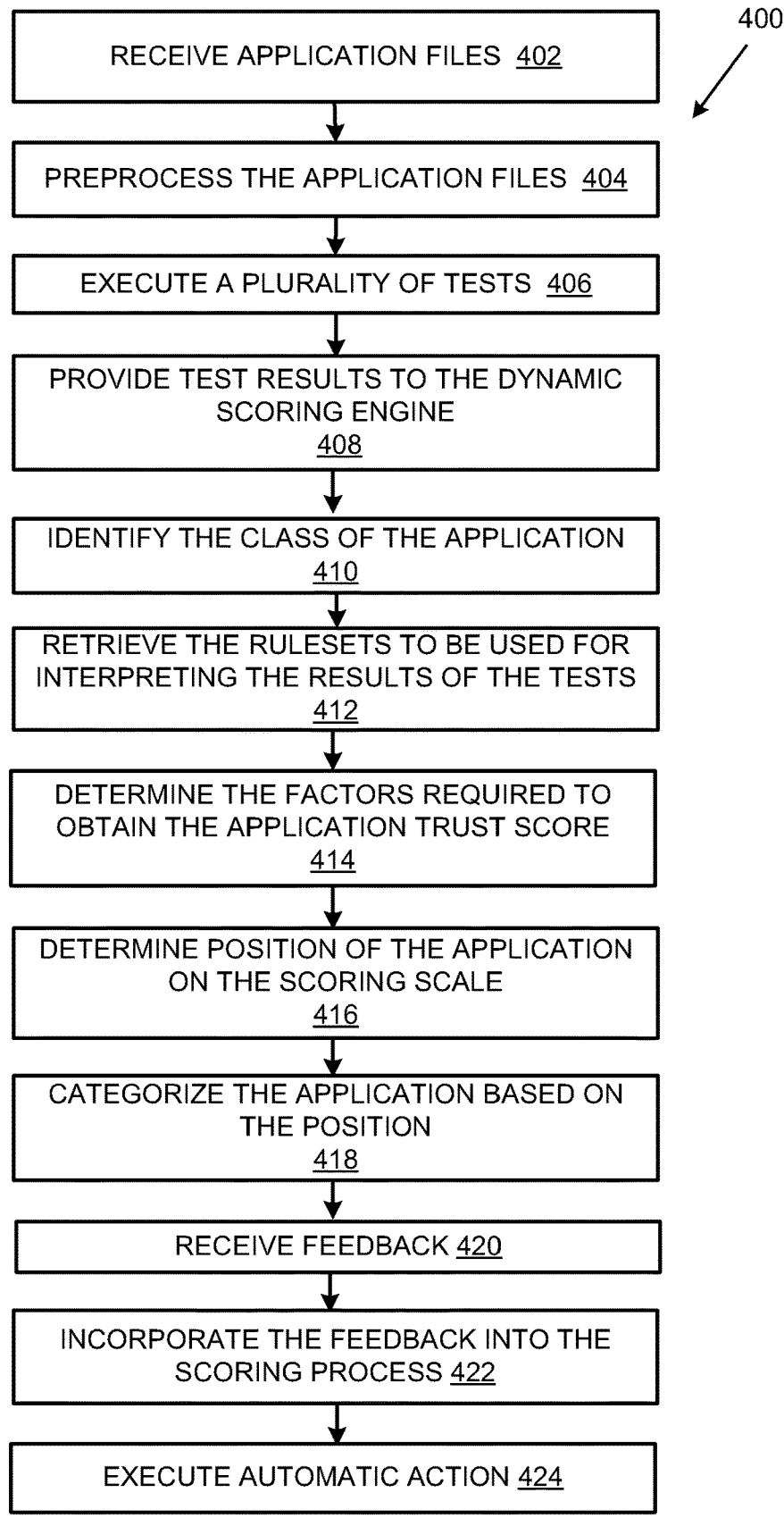
FIG. 4A shows a flowchart that details a method of testing, scoring and categorizing applications in accordance with examples disclosed herein.

FIG. 4A shows a flowchart 400 that details a method of testing, scoring and categorizing applications in accordance with examples disclosed herein. The method begins at 402 wherein the application files 152 of the application 150 to be scored and tested are received. The application files 152 are initially preprocessed at 404 to detect presence of harmful code such as malware and to extract metadata of the application 150. If malware is detected in the application files at 404, the application 150 may be rejected. If no malware is detected at 404 the plurality of tests for determining the functioning of the application 150 under the tenets which include security, compatibility, performance and compliance are executed at 406. In an example, the application 150 may be tested for security and compatibility tenets using tools such as MOBSF. The application 150 may be further tested for compatibility with various devices using tools such as Android Package Kit (APK) analyzer. Similarly models such as AWS Device Farm can be used to check for device compatibility and dynamic analysis. The application 150 is also tested for compliance issues e.g., static-meta compliance using ML tools such as Google Vision that enable object recognition from static imagery included in the application files 152.

The results 142 from executing the various tests are provided to the dynamic scoring engine 110 at 408. The type of application or a classification of the application 150 into one of a plurality of functional classes, e.g., financial, gaming, entertainment, communication, data processing, productivity etc., can be identified at 410 using the metadata extracted from the application files 152. In an example, the party promoting the application 150 may be required to provide such metadata in the application files 152. The application functional class is used at 412 to retrieve the rulesets to be applied in order to interpret the results 142 of the plurality of tests. In an example, more than one ruleset can be applied under a criterion based on additional influencing factors such as, but not limited to:
1) Target Age Group
2) Target Geography
3) Purchase modes.

These factors are activated when certain rule sets are violated. The rulesets can be governed by true or false conditions of applicability factors. Non-limiting examples of certain applicability factors are discussed below for illustration purposes:

i) Applicability factor of Target Age Group: This applicability factor is set to true, for example, if the rulesets related to images are applicable. The purpose is to test if a target age group of the application is below a certain threshold e.g., 10 years. If the application files 152 include metadata indicating the threshold target age group, then the rulesets related to image/object verification are applied to the results 142. Also, the severity of the rulesets and the priority level of the criteria related to non-compliant images will increase to the highest level thereby impacting the overall classification of the application 150. Therefore, if the application 150 includes non-compliant images such as images of alcohol, then the application 150 may be assigned a low application trust score and classified as vulnerable.

ii) Applicability factor of Target Geography: This applicability factor is set to true if the rulesets related to certain target geographies such as Europe, are applicable. If the application files 152 include metadata indicating that the application 150 is intended for the target geographies, then the rulesets related to locale-specific regulatory measures such as, GDPR are applied. Also, the severity of the rulesets and the priority level of the criteria related to GDPR will increase to a highest level thereby impacting the overall classification of the application 150.

iii) Applicability factor of Purchase Modes: This applicability factor is set to true if the rulesets related to security aspects are applicable. If the application files 152 indicate that the application 150 enables In App purchases or other financial transactions, the rulesets related to finance domain are applicable regardless of the application type that may be indicated in the application metadata. Accordingly, the severity of the rulesets and the priority level of the criteria related to security of the financial transactions will increase to a highest level thereby impacting the overall classification of the application 150.

In an example, the rulesets also enable determining weightage to be accorded to each of the tenets, the priorities to be assigned to the criteria under each tenet and the severity of the rulesets under each criterion. Thus, the various factors required for obtaining the value of the application trust score 172 are determined from the rulesets at 414. The application trust score 172 is calculated at 416 from the factors obtained using the rulesets. The position of the application 150 on the scoring scale 134 is determined at 416 based on a comparison of the application trust score 172 with the lower and upper trust threshold values. The positioning of the application 150 on the scoring scale enables categorizing the application 150 at 418 into one of a plurality of trust categories which can include vulnerable, potentially vulnerable and safe. The output produced by the scoring system 100 including one or more of the results 142, the application trust score 172, is provided for validation to a human reviewer and the feedback from the human reviewer is received at 420. The reviewer may affirm or reject the output of the scoring system 100 in whole or in part. The feedback is incorporated into the scoring process at 422 by changing one or more of the tenet weights, the priorities of the criteria, the severities of the rulesets and the trust threshold values. In an example, a trained feed forward neural network can be used to identify updated or newer values for the one or more of the tenet weights, the priorities of the criteria, the severities of the rulesets and the trust threshold values. An automatic action is executed at 424 depending on the positioning of the application 150 on the scoring scale 134 after incorporation of the feedback 146.

Figure 4B:
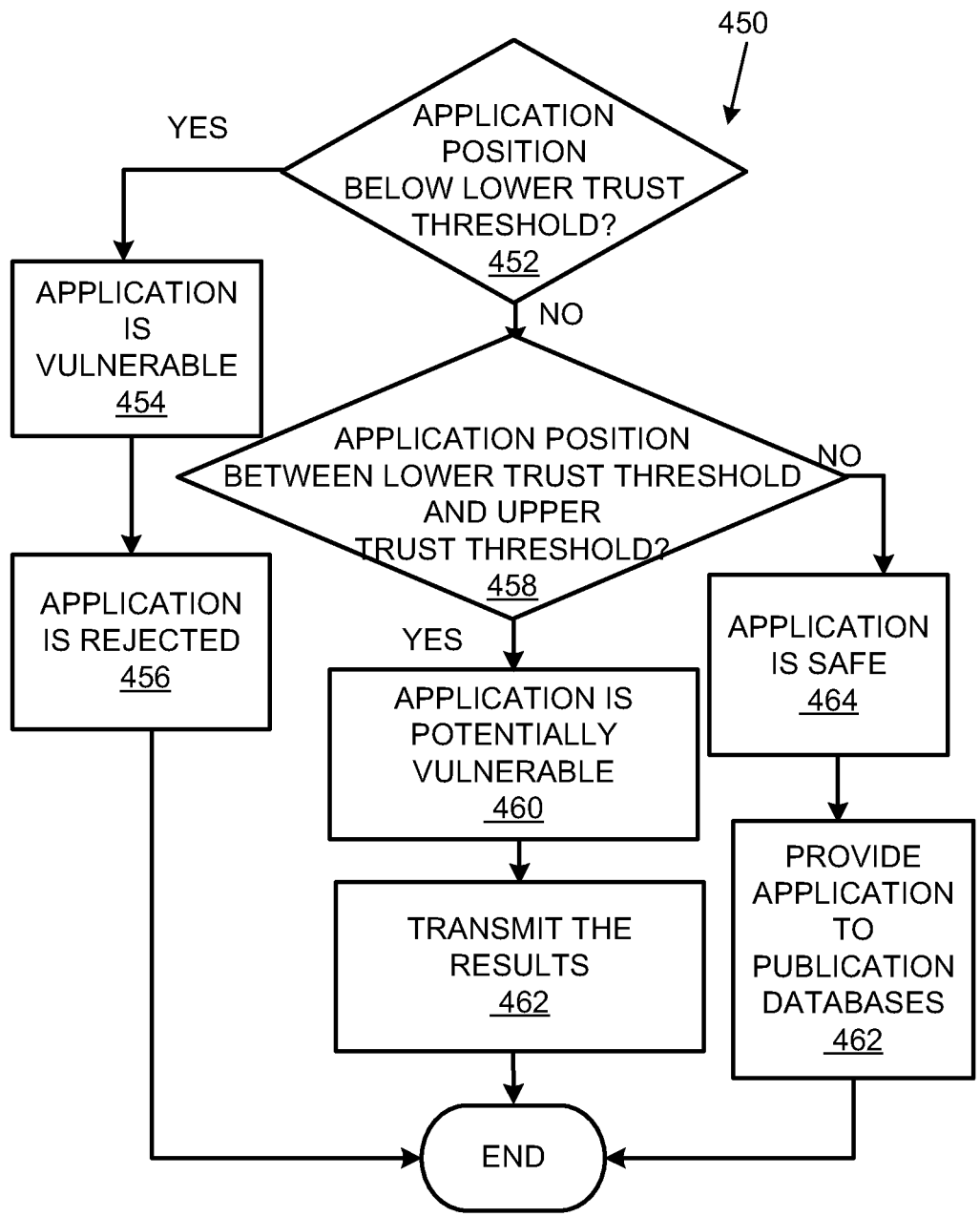
FIG. 4B shows a flowchart detailing a method of executing an automatic action based on the positioning of the application on a scoring scale in accordance with the examples disclosed herein.

FIG. 4B shows a flowchart 450 detailing a method of executing the automatic action based on the positioning of the application on the scoring scale 134 after the incorporation of the feedback 146 in accordance with the examples disclosed herein. At 452, it is determined if the position of the application 150 on the scoring scale 134 is below the lower trust threshold value. If it is determined at 452 that the position of the application 150 on the scoring scale 134 is below the lower trust threshold value, the application 150 is categorized as vulnerable at 454 and rejected for publication at 456. If it is determined at 452 that the position of the application 150 on the scoring scale 134 is not below the lower trust threshold value, it is further determined at 458 if the application 150 is positioned between the lower trust threshold value and the upper trust threshold value. If yes, then the application 150 is categorized as potentially vulnerable at 460 and a communication with the results 142 and suggestions for improvement of the application 150 under the tenets is transmitted at 462. The suggestions for improvement can be generated based on the results 142 from executing the various tests. The data from the results can be framed into suggestion templates and may be transmitted with the report 144. By way of illustration and not limitation, suggestions from different tests conducted under different tenets may be provided such as, "Device memory consumption is too high", or "Cleartext Storage of Sensitive Information", "Improper Neutralization of Special Elements used in an SQL Command", Improper Certification Validation", "Incorrect Default Permissions", "Use of Broken or Risky Cryptographic Algorithm", "Information Exposure", etc. In an example, the categorization of the application 150 can again be transmitted for validation to a human reviewer who can provide a feedback regarding the categorization and the suggestions for improvement can be transmitted after the validation. If it is determined at 458 that the application 150 is not positioned between the lower trust threshold value and the upper trust threshold value, it is determined that the application is above the upper trust threshold and hence that the application 150 is categorized as safe for publication at 464. Accordingly, the application 150 can be provided to publication databases at 466 for download by the users.

Figure 5:
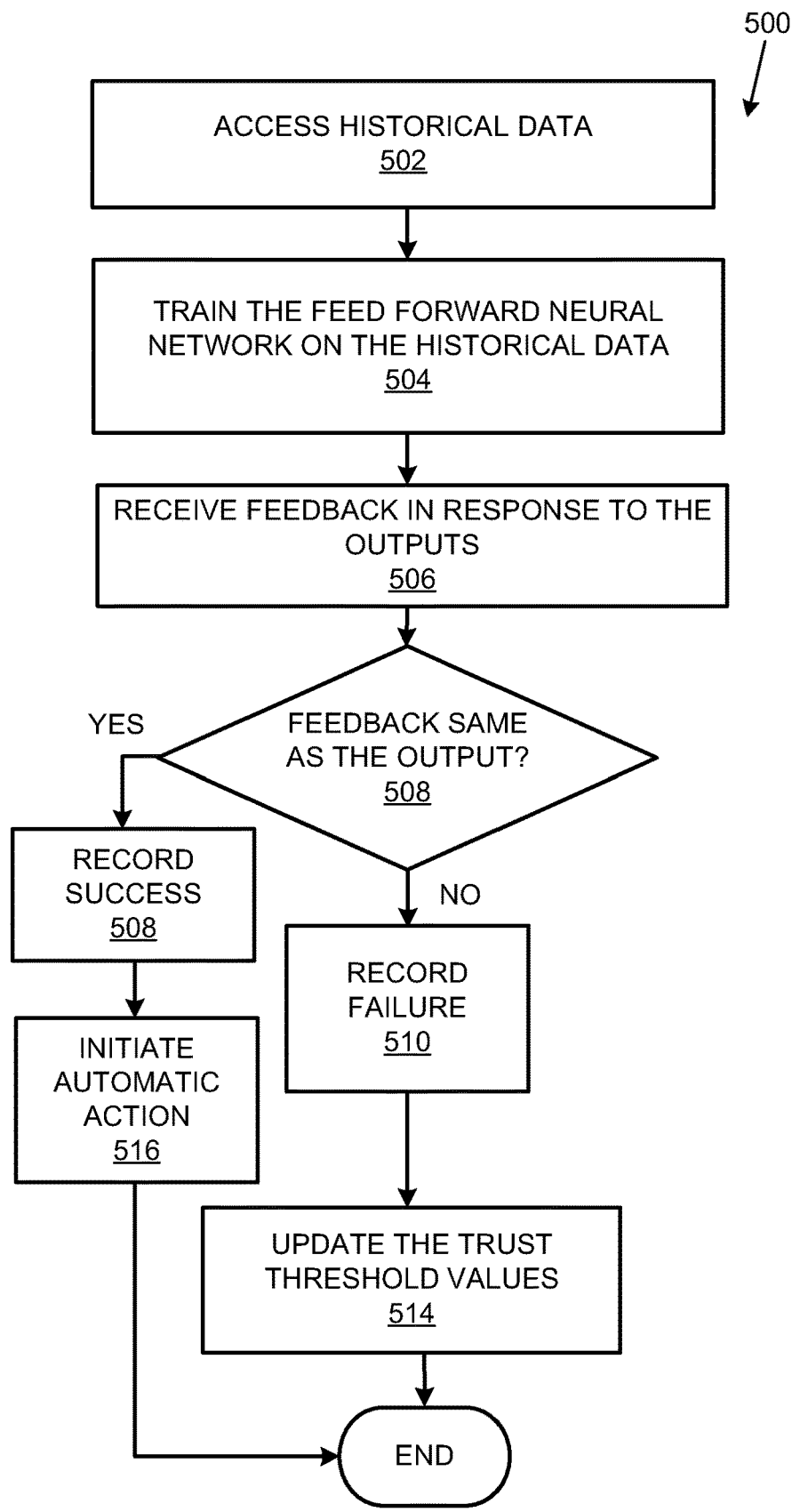
FIG. 5 shows a flowchart that details a method of incorporating feedback into a scoring process in accordance with the examples disclosed herein.

FIG. 5 shows a flowchart 500 that details a method of incorporating the feedback into the scoring process in accordance with the examples disclosed herein. The method begins at 502 with accessing the historical data 350 that includes categorizations generated by the scoring system 100 for the previously scored applications and the corresponding feedback provided by the reviewer for each of the previously scored applications. In an example, the historical data 350 may also include the weightage accorded to each of the tenets, the priorities assigned to the criteria under each tenet and the severity of the rulesets under each criterion. At 504, the feed forward neural network 362 is trained on the historical data 350 to automatically adjust the lower and the upper trust threshold values in addition to the severity levels when the reviewer changes the categorization of an application. The feedback 146 is received at 506 in response to the outputs generated by the scoring system 100 which can include the trust category 182 of the application 150. At 508, it is determined if the feedback 146 is the same as the outputs generated by the scoring system 100. If yes, then a success is recorded for the scoring system at 510 and the automatic action can be initiated at 516. If, however, it is determined at 508 that the feedback 146 is different the outputs generated by the scoring system 100, e.g., a different categorization is received, then a failure is recorded at 512. The feedback 146 may differ from the values produced by the scoring system 100 for various reasons. One reason can be that components enabling the application 150 are upgraded and hence what was previously unacceptable has become possible. For example, an upgrade in one or more of the hardware or software has improved the device compatibility of the application 150. Day 0 vulnerabilities form another reason that the feedback 146 can differ from the output of the scoring system 100. When a day 0 vulnerability is reported, one or more of the plurality of tests that are administered by the scoring system 100 may be updated. Accordingly, the rulesets can be automatically updated via the feedback given to the scoring system 100. Based on the number of failures recorded, various elements of the scoring system such as, the one or more of the lower and upper trust threshold values, the priorities assigned to the criteria under each tenet and the severity of the rulesets under each criterion are adjusted at 514.

Figure 6:
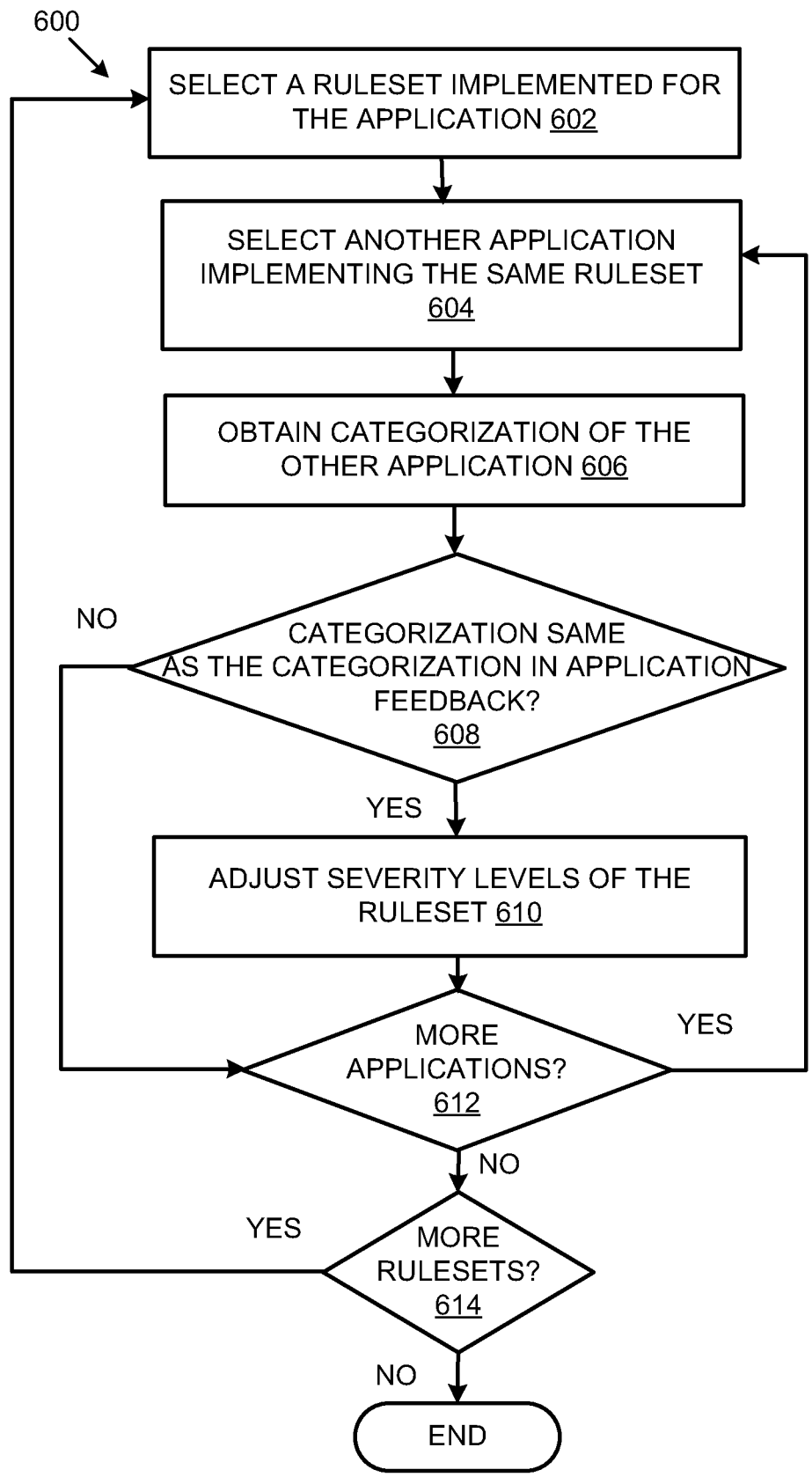
FIG. 6 details a flowchart of a method for adjusting the trust threshold values in accordance with the examples disclosed herein.

FIG. 6 details a flowchart 600 of a method for adjusting the trust threshold values implemented by the threshold adjustment engine 138 when the categorization of the application 150 detected in the feedback 146 is different from the categorization determined by the scoring system 100 in accordance with the examples disclosed herein. While the feedback 146 includes the reviewer's change to the overall categorization of the application 150 from one of the vulnerable, potentially vulnerable and safe to another categorization, it can be appreciated that such categorization is based on the upper and lower trust threshold values. These trust thresholds values depend on the severities of the corresponding rulesets implemented by the scoring system 100 for the application 150. Therefore, a change to the categorization of the application 150 results in corresponding changes to the severity thresholds of the rulesets. The feed forward neural network 362 is configured to identify new severity values for individual rulesets based on the training data 148 which includes the historical data 350.

The method begins at 602 wherein a ruleset implemented for the application 150 is selected for threshold analysis. Any one of the plurality of rulesets associated with the multiple criteria in connection with the four tenets that are implemented for analyzing the results 142 of the application 150 can be selected at 602. At 604, another application which implemented the same ruleset under the same criterion and the same tenet is selected from a plurality of other applications for which information is included in the historical data 350. The categorization of the other application from validation data i.e., the categorization provided by a reviewer for the other application is identified from the historical data at 606. At 608, it is determined if the categorization of the other application is the same as the categorization of the application 150 as received in the feedback 146.

If it is determined at 608 that the categorization of the other application obtained at 606 is not the same as the categorization of the application 150 detected form the feedback 146, the method loops to 612 to determine if more applications implementing the same ruleset exist in the historical data 350. If no more applications implementing the ruleset exist at 612, the method moves to 614 to determine if further rulesets remain for analysis. If yes, the method returns to 602 to select the next ruleset. If it is determined at 614 that no further rulesets remain for analysis, the method terminates on the end block.

If it is determined at 608 that the categorization of the other application in the historical data is the same as the categorization of the application 150 detected form the feedback, then the method proceeds to 610 wherein the severity level of the ruleset for the application 150 is adjusted to be identical to the severity level of that ruleset for the other application and the steps from 612 onwards are repeated as described above.

Figure 7:
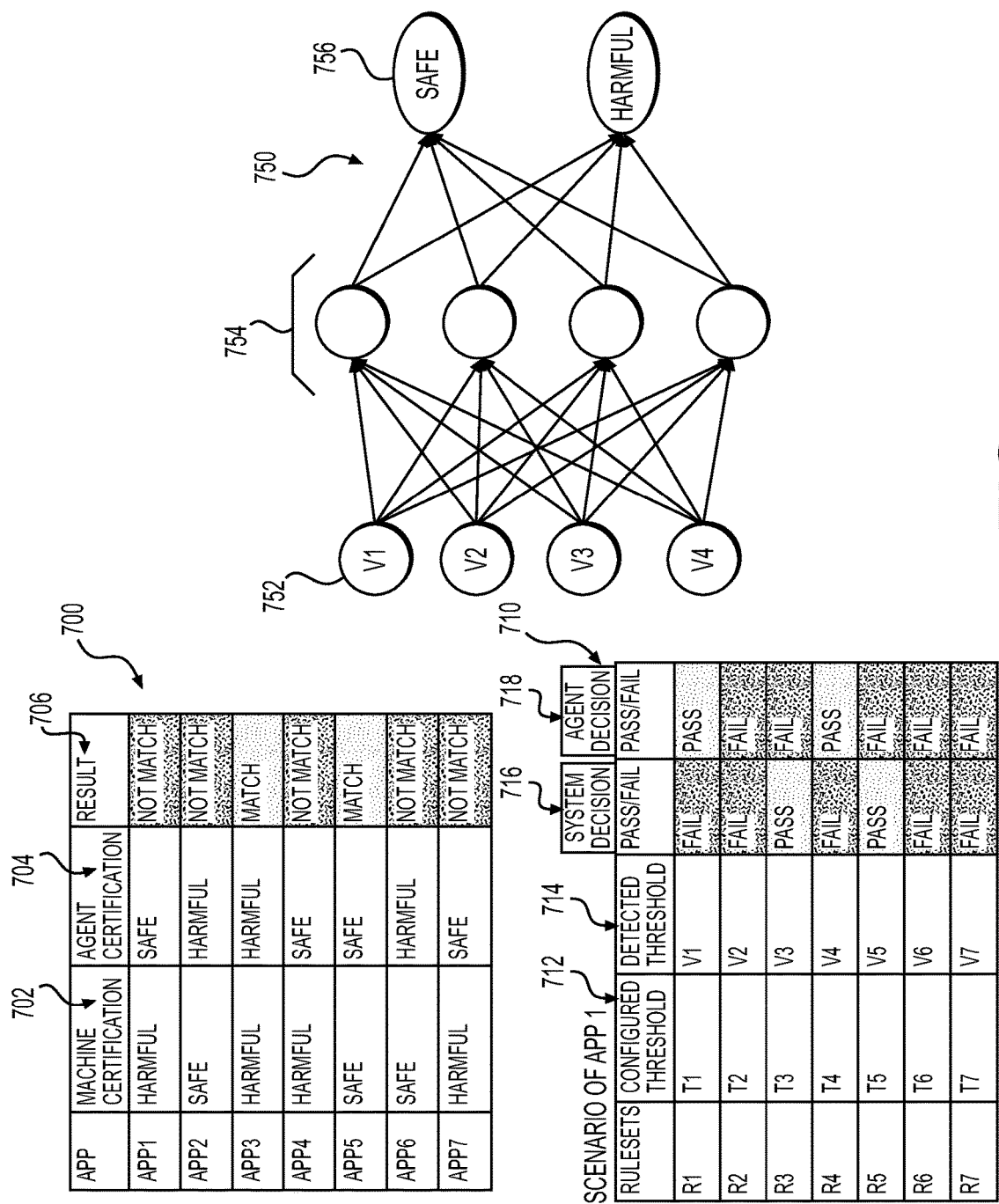
FIG. 7 shows example datasets analyzed by a feed forward neural network in accordance with the examples disclosed herein.

FIG. 7 shows example datasets 700 and 710 analyzed by a feed forward neural network 750 in accordance with the examples disclosed herein. The accuracy of certification of an application by the scoring system 100 is impacted at least by three factors: i) Ruleset Threshold Configuration which is adjusted by the threshold adjustment engine, ii) Scoring scale configuration which is directly impacted by the ruleset threshold configuration, and iii) The actual test case running in the backend for which the ruleset is activated. In an example, the test case can be manually administered based on administrator insights. The dataset 700 shows the sample review results for the applications from App1 to App7. For each of the applications, the machine certification column 702, the agent certification column 704 can be compared and the results are displayed in the results column 706. The machine certification matches the agent certification only for App3 and App5. Hence, the scoring system 100 needs to be trained using the feedback info including the agent certification for other applications to produce more accurate results wherein the machine certification matches the agent certification to a greater extent.

Table 710 shows the scenario for App1 including the configured thresholds 712 (i.e., thresholds generated by the scoring system 100) and the detected thresholds 714 and categorization of the App1 by the scoring system 100 as system decision 716 and reviewer categorization as Agent decision 718 are shown for each of the rulesets R1 to R7. Whenever, Agent decision 718 differs from the system decision 716 it implies that the corresponding configured threshold 712 has to be readjusted to coincide with the designated threshold 714. The scoring system 100 enables auto-correction of thresholds for any ruleset. Based on the manual corrections/updates to test cases can also be applied by an administrator.

The feed forward neural network 750 is used to identify a new set of thresholds for individual rulesets based on training datasets such as the datasets 700 and 710. The feed forward neural network 750 includes an input layer 752, one or more hidden layers 754 and an output layer 756. As described supra, feed forward neural network 750 tries different variations in thresholds for a particular ruleset across multiple applications to achieve a "match" decision with what the agent or review has identified for the particular application. In the feed forward neural network 750, V1, V2, V3 and V4 are example detected threshold values for the application 150 while 'safe' and 'harmful' are the results in the output layer refer to the options for decisions to be made for the application by the reviewer.

Figure 8:
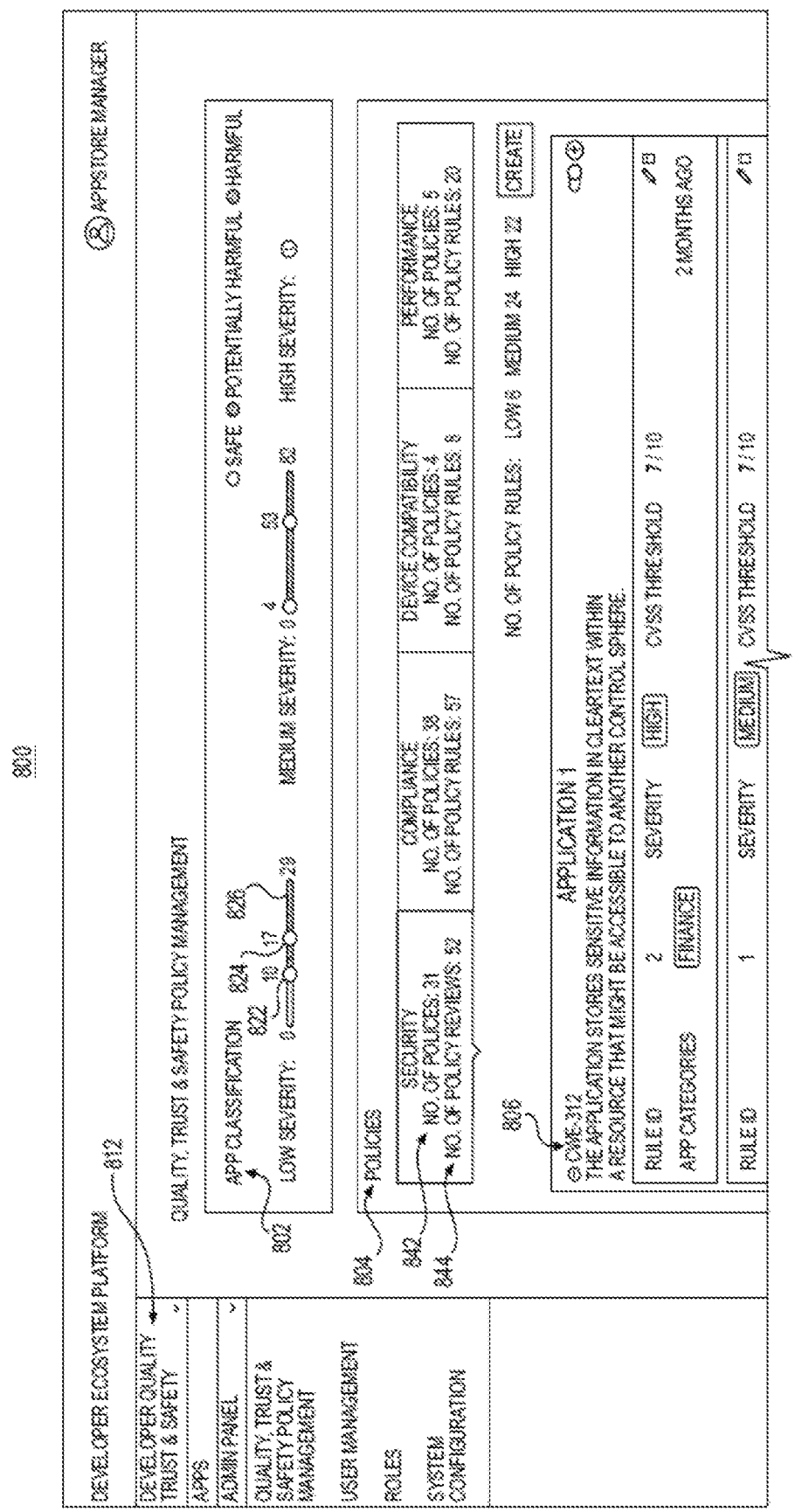
FIG. 8 shows an administrative user interface (UI) in accordance with the examples disclosed herein.

FIG. 8 shows an administrative user interface (UI) 800 in accordance with the examples disclosed herein. The left hand side 812 of the UI 800 includes different tabs for apps, admin panel, quality, trust and safety policy management, user management, roles and system configuration. The main screen of the UI 800 includes an app classification area 802, a policies area 804 and an app area 806. The app area 806 includes details regarding the application under consideration which include the trust category, the details regarding the rules such as the rule id, the severity of the rules, the value of the thresholds, etc. The policies area 804 shows the number of policies 842 and number of policy rules 844 that form rulesets under the tenet for each of the four tenets. The app classification area 802 includes a user interface with controls that permit overriding the severity thresholds for the rulesets for the application 150. The controls include a slider 826 to adjust the lower trust threshold value 822 and the upper trust threshold value 824 on a slider 826 set by the scoring system 100 for different rule sets implemented by the application. Of course, it can be appreciated that the severity scale set by the scoring system 100 for the application 150 can also be displayed on the slider 826 in addition to which manual configuration of the severity threshold values is allowed as described above.

Figure 9:
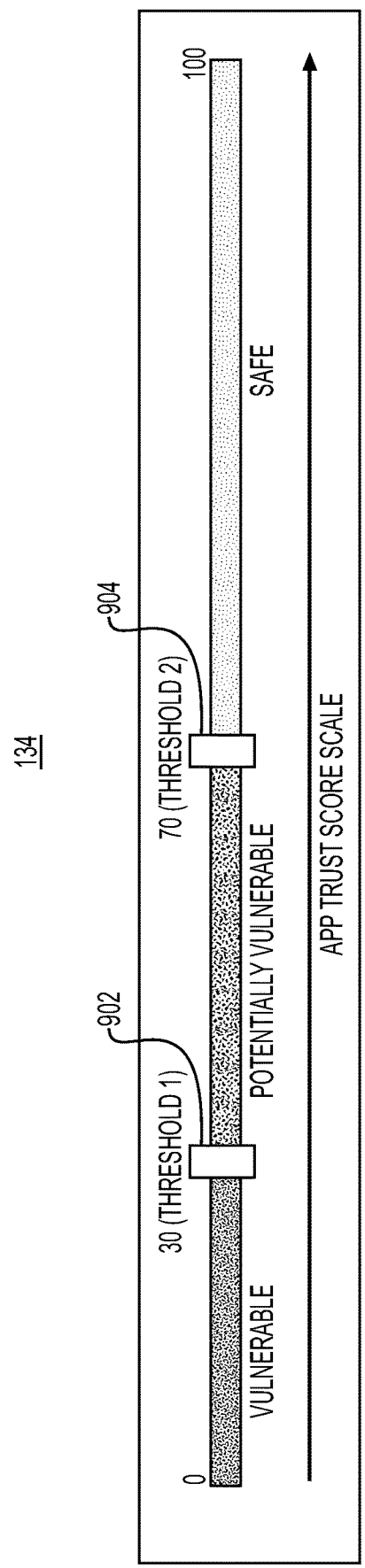
FIG. 9 shows a representation of the scoring scale in accordance with the examples disclosed herein.

FIG. 9 shows a representation of the scoring scale 134 in accordance with the examples disclosed herein. The scoring scale 134 is a converged aggregated scale that considers the 360 degree trust score of the application, i.e., the application 172 trust score generated by the multi-facet policies of the scoring system 100. The scoring scale enables administrators of application publication platforms such as play stores for mobile devices to define thresholds that enable categorizing applications as vulnerable, potentially vulnerable and safe. The base thresholds which include the lower trust threshold 902 and the upper trust threshold 904 are automatically adjusted based on the following factors and count of entities:

i) $T_i D_i$: Degree of importance of a tenet. (Assuming that there are 4 tenets, i=1,2,3,4)
ii) $T_i C_i PW_x$: Weightage of priority levels of the criteria. (Assuming 3 priority levels x=1,2,3)
iii) $T_i R_i W_x$: Weightage of severity levels of rule set. (Assuming 3 severity levels, x=1,2,3)

In an example, the ranges given above can be overridden as the scoring system 100 evolves or as one or more of tenets, criteria or rulesets are upgraded. In an example, the Absolute weightage of any ruleset is given as:

$$\text{Absolute weightage of any ruleset} = T_i R_i W_x * T_i C_i P W_x * T_i D_i \quad \text{Eq. (2)}$$

Based on a range of values for each entity given above, the possible absolute weightage range for any rule set can be any of among numbers: 1, 2, 3, 4, 6, 8, 9, 12, 16, 18, 24 and 36. In an example, the lower trust threshold 902 and the upper trust threshold can be obtained as:

$$\text{Lower trust threshold} = \text{Count of rules whose Absolute Weightage} <= X/\text{Total Count Of Rules} \quad \text{Eq. (3)}$$

$$\text{Upper trust threshold} = \text{Count of rules whose Absolute Weightage} >= Y/\text{Total Count Of Rules} \quad \text{Eq. (4)}$$

where: $X$=CIEL (Median of all absolute weightages of the rulesets configured in the scoring system)−$n$ Eq. (5)

$Y$=CIEL (Median of all absolute weightages of rule sets configured in the scoring system)+$n$ Eq. (6)

In the equations above n is the buffer value maintained on the scoring scale 134 and determines the range of a grey list area on the scoring scale 134. Larger value of n indicates a larger grey list area so n may be kept higher during the initial testing and slowly moved to one based on the test results. In an example, the lowest values of the absolute weightages of rulesets configured within the scoring system 100 may also be used in the calculations for X and Y in Eq. (5) and Eq. (6).

Figure 10:
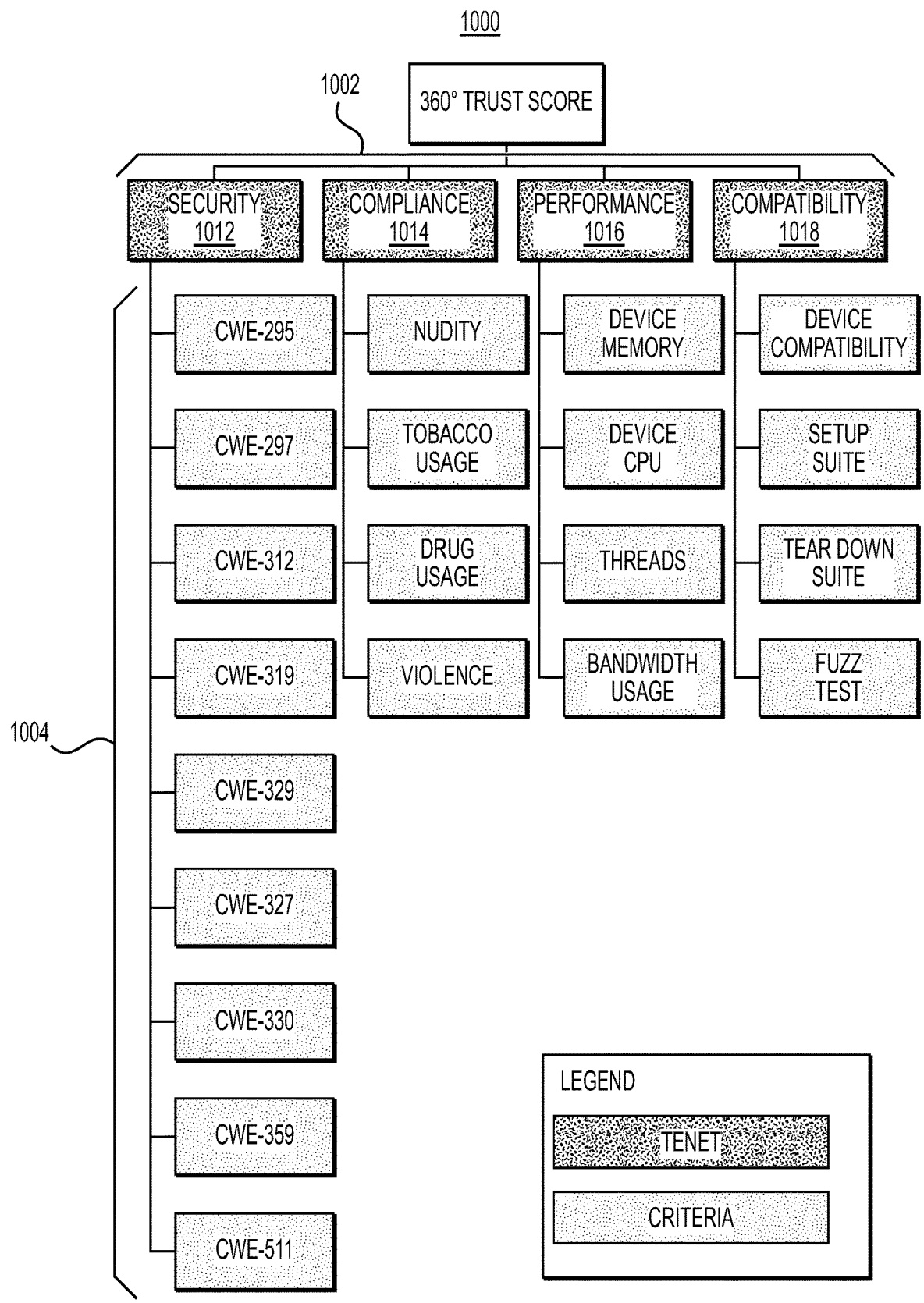
FIG. 10 includes a diagrammatic representation showing the hierarchy of policies and parameters implemented by the scoring system.

FIG. 10 includes a diagrammatic representation 1000 showing the hierarchy of the policies and parameters implemented by the scoring system 100. Different criteria 1004 are classified under each of the tenets 1002. The details of the criteria are shown and discussed for illustrative purposes only and it can be appreciated that more or less criteria and tenets can be included by the scoring system in accordance with the examples disclosed herein. The compliance tenet 1014 includes nudity, tobacco usage, drug and alcohol usage and violence. Accordingly, if any applications e.g., the application 150, include content identified from the plurality of tests as including the aforementioned themes, then such applications are subject to rulesets configured under each of the above criteria and a part of the application trust score 172 is based on whether the application 150 complies with the requirements set forth by the rules.

Figure 11:
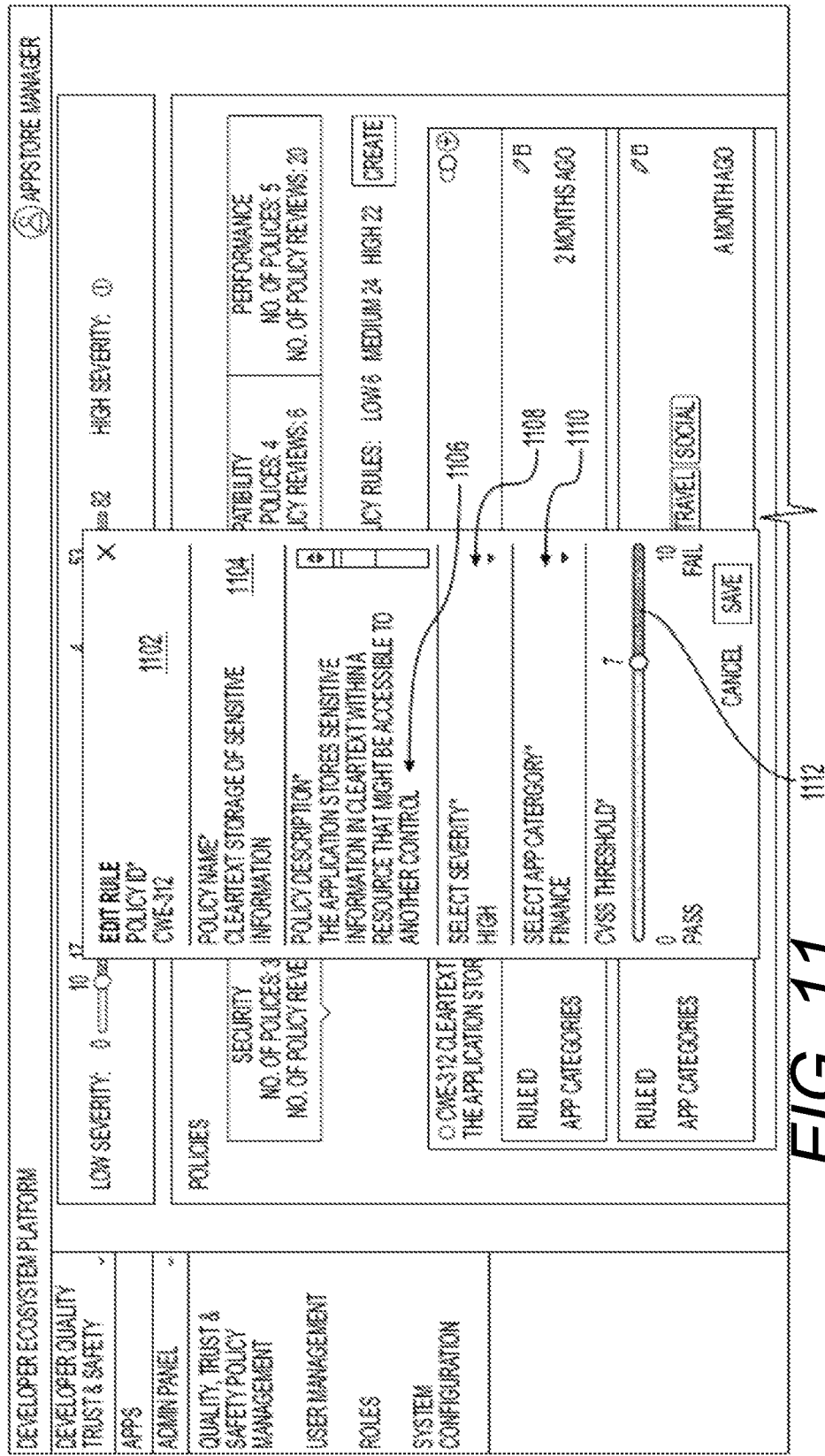
FIG. 11 shows an edit rule UI which enables editing rules in accordance with the examples disclosed herein.

The performance tenet 1016 includes criteria pertaining to device memory, device central processing unit (CPU), threads and bandwidth usage. Therefore, the rulesets pertaining to these criteria can define at least the parameters associated with the device capabilities and the limits associated with the device resources that can be used by the application 150. A portion of the application trust score 172 reflects how well the application complies with the requirements set forth by the rules under these device criteria. Similarly, the compatibility tenet 1018 includes criteria like device compatibility, setup suite, tear down suite and fuzz test. The rules under these criteria can specify for example, the requirements in terms of number devices that the application is to be compatible with, the setup suite which is the installation package associated with the application 150, tear down suite pertains to uninstallation of the application 150 and fuzz test which indicates the stability of the application 150 during execution. Finally, the security tenet 1012 is supported by corresponding common weakness enumerations (CWEs). Below is a non-limiting listing some example CWEs for which the rulesets are included in the scoring system 100:

Code Name
CWE-295 Improper Certificate Validation
CWE-297 Improper Validation of Certificate with Host Mismatch
CWE-312 Cleartext Storage of Sensitive Information
CWE-319 Cleartext Transmission of Sensitive Information
CWE-329 Not Using a Random IV with CBC Mode
CWE-327 Use of a Broken or Risky Cryptographic Algorithm
CWE-330 Use of Insufficiently Random Values
CWE-359 Exposure of Private Information ('Privacy Violation')
CWE-511 Logic/Time Bomb
CWE-532 Inclusion of Sensitive Information in Log Files
CWE-601 URL Redirection to Untrusted Site ('Open Redirect')
CWE-672 Operation on a Resource after Expiration or Release
CWE-749 Exposed Dangerous Method or Function
CWE-780 Use of RSA Algorithm without OAEP
CWE-798 Use of Hard-coded Credentials
CWE-89 Improper Neutralization of Special Elements used in an SQL Command
CWE-772 Missing Release of Resource after Effective Lifetime
CWE-904 Malware Detection
CWE-920 Improper Restriction of Power Consumption
CWE-921 Storage of Sensitive Data in a Mechanism without Access Control
CWE-925 Improper Verification of Intent by Broadcast Receiver
CWE-927 Use of Implicit Intent for Sensitive Communication
CWE-919 Weaknesses in Mobile Applications CWE-939 Improper Authorization in Handler for Custom URL Scheme
CWE-941 Incorrectly Specified Destination in a Communication Channel
CWE-968 SFP Secondary Cluster: Covert Channel
CWE-940 Improper Verification of Source of a Communication Channel
CWE-120 Buffer Copy without Checking Size of Input
CWE-200 Information Exposure
CWE-250 Execution with Unnecessary Privileges
CWE-276 Incorrect Default Permissions FIG. 11 shows an edit rule UI 1100 which enables editing rules in accordance with the examples disclosed herein. Various properties of the rules such as severity, policy description, the thresholds, etc. can be set using the edit rule UI 1100 Text boxes 1102, 1104, and 1106 enable entering respective policy attributes such as the policy id, policy name and policy description. In addition, the policy severity 1108, the app category (or classification based on the type of application) 1110 and a slider control 1112 to set the threshold are provided.

Figure 12:
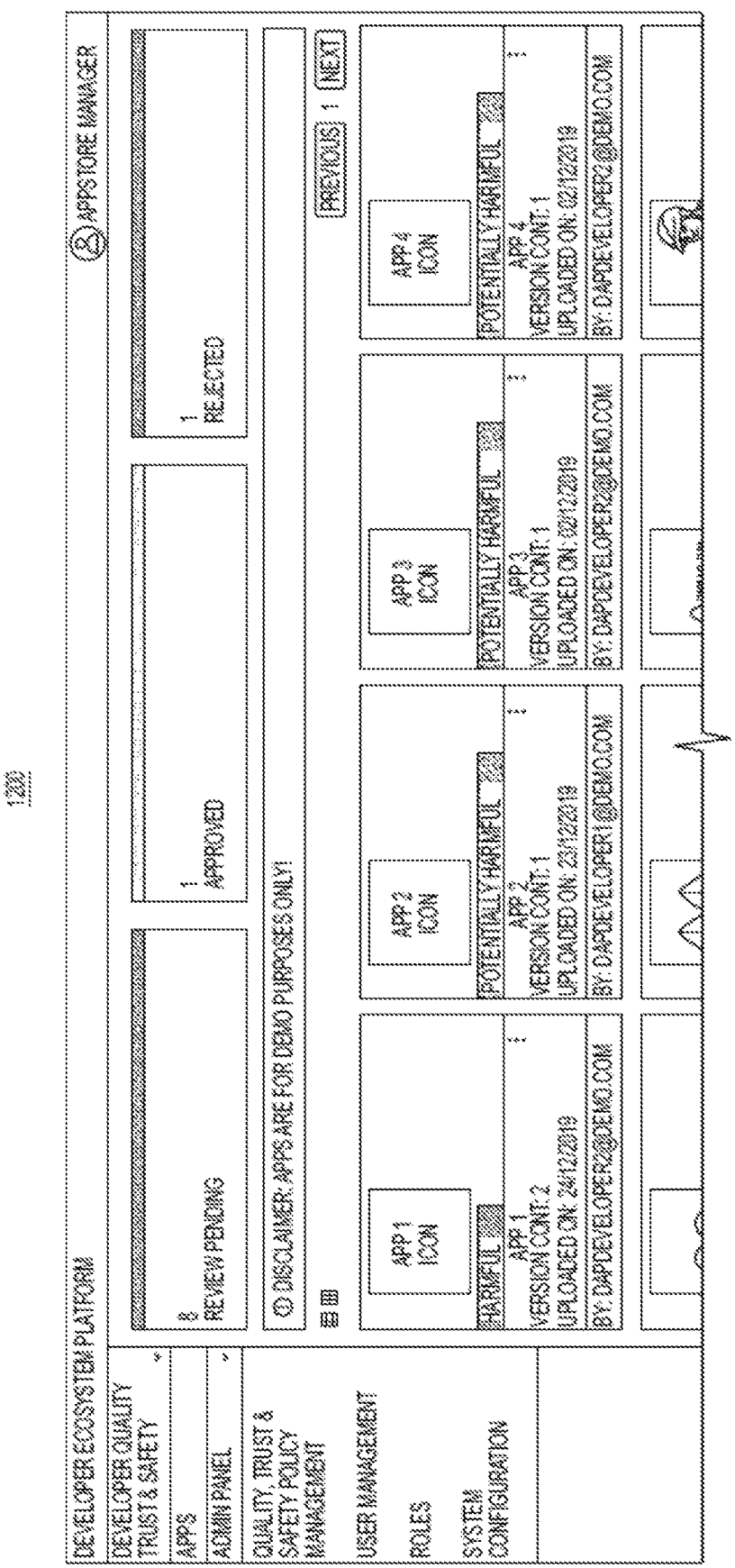
FIG. 12 is an illustration of an admin panel of the administrative UI in accordance with the examples disclosed herein.

FIG. 12 is an illustration of an admin panel 1200 of the administrative UI 800. The admin panel 1200 shows the various applications that were scored in accordance with the examples disclosed herein. The admin panel 1200 shows the number of applications that are pending review, the number of applications approved and the number of applications rejected.

Figure 13:
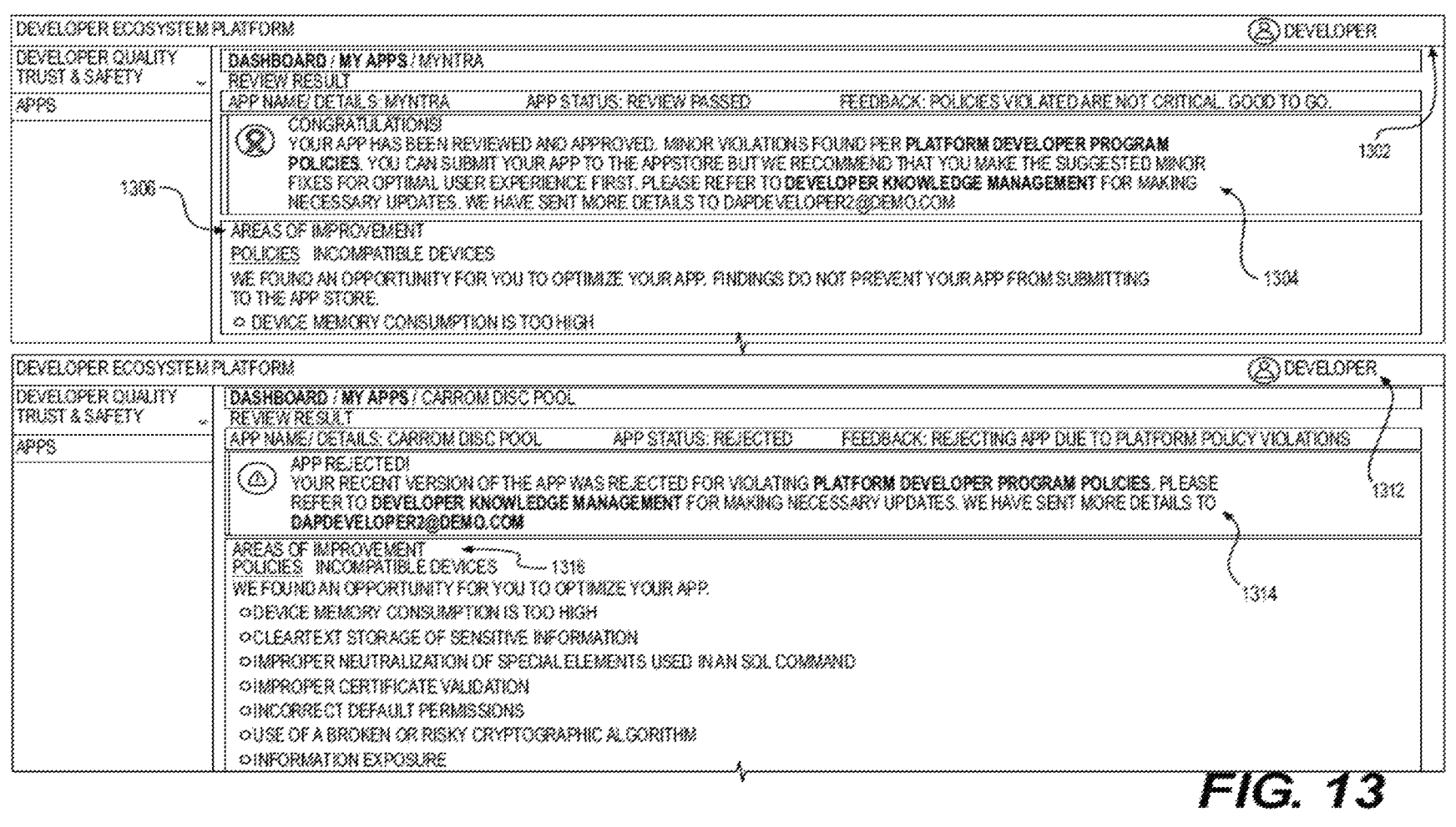

FIG. 13 shows the approval and rejection notifications transmitted to the concerned parties in accordance with the examples disclosed herein. The approval notification 1302 includes a message 1304 that the application has passed review by the scoring system 100 under the four tenets. The approval notification 1302 also suggests areas for improvement 1306 that can further optimize the application. The rejection notification 1312 includes a message 1314 that the application was rejected from publication due to policy violations. The rejection notification 1312 also includes the listing of areas for improvement 1316 where the application needs to be further optimized for being eligible for publication.

Figure 14:
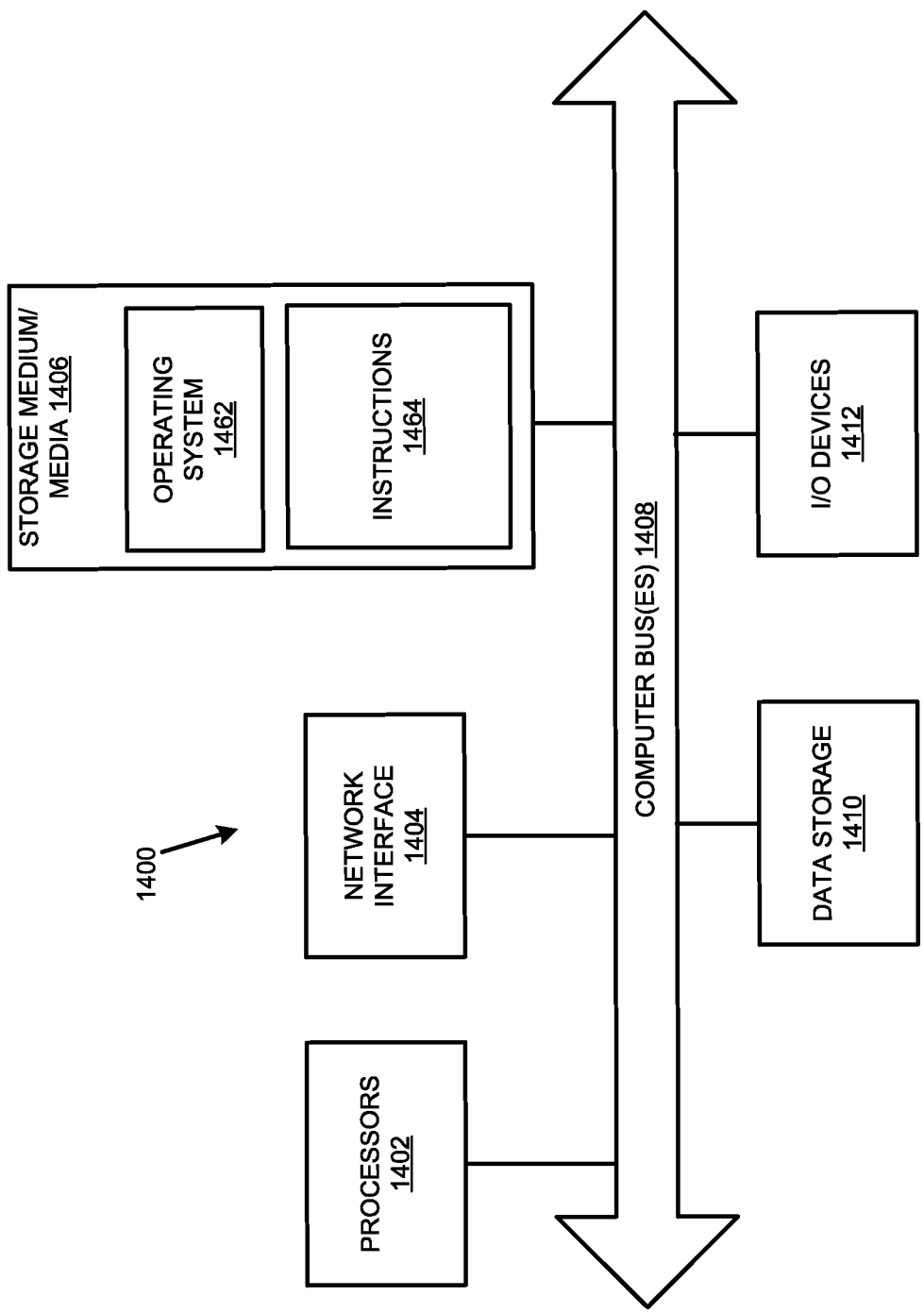
FIG. 14 illustrates a computer system that may be used to implement the dynamic testing and scoring system.

FIG. 14 illustrates a computer system 1400 that may be used to implement the scoring system 100. More particularly, computing machines such as desktops, laptops, smartphones, tablets and wearables which may be used to generate or access the data from the scoring system 100 may have the structure of the computer system 1400. The computer system 1400 may include additional components not shown and that some of the process components described may be removed and/or modified. In another example, a computer system 1400 can sit on external-cloud platforms such as Amazon Web Services, AZURE® cloud or internal corporate cloud computing clusters, or organizational computing resources, etc.

The computer system 1400 includes processor(s) 1402, such as a central processing unit, ASIC or other type of processing circuit, input/output devices 1412, such as a display, mouse keyboard, etc., a network interface 1404, such as a Local Area Network (LAN), a wireless 802.11x LAN, a 3G, 4G or 5G mobile WAN or a WiMax WAN, and a processor-readable medium 1406. Each of these components may be operatively coupled to a bus 1408. The computer-readable medium 1406 may be any suitable medium that participates in providing instructions to the processor(s) 1402 for execution. For example, the processor-readable medium 1406 may be non-transitory or non-volatile medium, such as a magnetic disk or solid-state non-volatile memory or volatile medium such as RAM. The instructions or modules stored on the processor-readable medium 1406 may include machine-readable instructions 1464 executed by the processor(s) 1402 that cause the processor(s) 1402 to perform the methods and functions of the scoring system 100.

The scoring system 100 may be implemented as software stored on a non-transitory processor-readable medium and executed by the one or more processors 1402. For example, the processor-readable medium 1406 may store an operating system 1462, such as MAC OS, MS WINDOWS, UNIX, or LINUX, and code 1464 for the scoring system 100. The operating system 1462 may be multi-user, multiprocessing, multitasking, multithreading, real-time and the like. For example, during runtime, the operating system 1462 is running and the code for the scoring system 100 is executed by the processor(s) 1402.

The computer system 1400 may include a data storage 1410, which may include non-volatile data storage. The data storage 1410 stores any data used by the scoring system 100. The data storage 1410 may be used to store the application files 152, the application metadata extracted from the application files 152, the results 142, the reports 144, the feedback 146 and other data that is used by the scoring system 100 during the course of operation.

The network interface 1404 connects the computer system 1400 to internal systems for example, via a LAN. Also, the network interface 1404 may connect the computer system 1400 to the Internet. For example, the computer system 1400 may connect to web browsers and other external applications and systems via the network interface 1404.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A dynamic application testing and scoring system, comprising:
at least one processor;
a non-transitory processor readable medium storing machine-readable instructions that cause the processor to:
receive results from executing a plurality of tests on an application, wherein the plurality of tests test the application on tenets including security, compliance, compatibility and performance;
select one or more rulesets corresponding to criteria under each of the tenets, wherein the rulesets are selected based at least on a classification associated with the application;
determine outputs of the plurality of tests on the application, wherein the outputs indicate if the application has passed or failed each of the plurality of tests based at least on applying the rulesets to the results;
calculate an application trust score for the application based on the results, weightage of each of the tenets for the application, priority levels of the criteria and severity levels of the rulesets;
identify a position for the application on a scoring scale based on the application trust score, the position of the application being relative to a pair of trust threshold values and the position corresponds to a configured categorization of the application into one of a plurality of trust categories that include safe, potentially vulnerable and vulnerable; and receive feedback regarding the configured categorization of the application, wherein if the feedback is not the same as the configured categorization, provide the feedback to a trained feedforward neural network that adjusts one or more of the pair of trust threshold values associated with the application on the scoring scale by:

for each of the rulesets implemented for the application, accessing historical data that includes categorizations provided by reviewers for a plurality of other applications;

identifying from the historical data, severity levels of another application that implements the rulesets and the other application has same categorization in the historical data as the categorization of the application in the feedback; and adjusting the severity levels of the rulesets for the application to have identical values as the severity levels of the other application as obtained from the historical data;

if the feedback is the same as the configured categorization, initiate an automatic action; and generate a report regarding the configured categorization of the application as provided in the feedback.

2. The dynamic application testing and scoring system of claim 1, wherein to execute the automatic action the processor is to further:

upload the application to a publication database if the application is positioned above an upper trust threshold value of the pair of trust threshold values on the scoring scale;

categorize the application for further analysis and development if the application is positioned between the upper trust threshold value and a lower trust threshold value of the pair of trust threshold values on the scoring scale; and reject the application for publication if the application is positioned below the lower trust threshold value on the scoring scale.

3. The dynamic application testing and scoring system of claim 1, wherein to receive the feedback the processor is to further:

provide determinations regarding the configured categorization of the application for validation to a reviewer.

4. The dynamic application testing and scoring system of claim 3, wherein the processor is to further:

automatically adjust one or more of an upper trust threshold value and a lower threshold value of the pair of trust threshold values on the scoring scale, wherein the adjustment is based on output from the feedforward neural network in response to receiving the feedback.

5. The dynamic application testing and scoring system of claim 4, wherein the processor is to further:

train the feedforward neural network on the historical data that further includes determinations regarding publication, categorization for further development and rejection of the plurality of other applications produced by the dynamic application testing and scoring system and validation data including feedback corresponding to the determinations from human reviewers for the plurality of other applications.

6. The dynamic application testing and scoring system of claim 1, wherein the pair of trust threshold values includes an upper trust threshold value and a lower trust threshold value that are configurable based on a degree of importance of each of the tenets configured for a particular classification of the application.

7. The dynamic application testing and scoring system of claim 1, wherein the processor is to further:

automatically update one or more of the rulesets in response to updates to one or more of the plurality of tests.

8. The dynamic application testing and scoring system of claim 7, wherein the one or more of the plurality of tests are updated in response to reported Day 0 vulnerabilities that are detected for an operating system on which the application is installed.

9. The dynamic application testing and scoring system of claim 1, wherein to execute the plurality of tests on the application the processor is to further:

scan a file of the application for malware; and test source code of the application for security vulnerabilities.

10. The dynamic application testing and scoring system of claim 1, wherein to execute the plurality of tests on the application the processor is to further:

extract static image files included in files of the application by decompiling the files of the application; and identify objects in the static image files by processing static images using machine learning (ML) models.

11. The dynamic application testing and scoring system of claim 1, wherein to execute the plurality of tests on the application the processor is to further:

test files of the application for device compatibility with one or more hardware platforms.

12. The dynamic application testing and scoring system of claim 1, wherein the processor is to further:

receive the weightage to be assigned to each of the tenets and for each tenet, the priority levels to be assigned to each of the criteria under that tenet.

13. The dynamic application testing and scoring system of claim 1, wherein a first ruleset of the rulesets assigned under the compliance governs types of content that can be included in the application and wherein a second ruleset of the rulesets assigned under the compliance enforces privacy laws of a geographic locale associated with the application.

14. The dynamic application testing and scoring system of claim 1, wherein the application permits financial transactions and a higher severity is associated with one or more of the rulesets governing login requirements under the security tenet.

15. A method of dynamically testing and scoring applications comprising:

executing a plurality of tests on an application, wherein the plurality of tests test the application on security, compatibility, compliance and performance tenets;

selecting one or more rulesets to be applied to results of the plurality of tests, wherein the one or more rulesets are selected based on a classification of the application and the one or more rulesets determine compliance of the application with one or more criteria under the tenets;

determining outputs of the plurality of tests on the application, wherein the outputs indicate if the application has passed or failed each of the plurality of tests based at least on applying the rulesets to the results;

determining an application trust score for the application based on degrees of importance of the tenets, priority levels of the criteria and severity levels of the rulesets;

categorizing the application into one of a plurality of trust categories that include vulnerable, potentially vulnerable and safe categories based on the application trust score that determines position of the application on a scoring scale relative to a pair of trust threshold values;

receiving feedback to an output including the categorization of the application into one of the plurality of trust categories, wherein:

if the feedback changes the trust category of the application, providing the feedback to a trained feedforward neural network that adjusts the pair of trust threshold values associated with the application on the scoring scale by:

for each of the rulesets implemented for the application, accessing historical data that includes categorizations provided by reviewers for a plurality of other applications;

identifying from the historical data, severity levels for another application that implements the rulesets and the other application has same categorization in the historical data as the categorization of the application in the feedback; and adjusting the severity levels of the rulesets for the application to be identical in values to the severity levels of the other application as included in the historical data;

if the feedback does not change the trust category of the application, initiating an automatic action; and generating a report regarding the categorization of the application as provided in the feedback.

16. The method of claim 15, further comprising:

providing a user interface with controls that permit overriding the severity levels for the rulesets for the application.

17. The method of claim 15, wherein the pair of trust threshold values include a lower trust threshold value and an upper trust threshold value and the lower trust threshold value is based on a number of the rulesets and a lower limit of absolute weightage of the rulesets and the upper trust threshold value is based on the number of the rulesets and an upper limit of absolute weightage of the rulesets wherein the absolute weightage of the rule sets is a cumulative quantity including the degrees of importance of the tenets, the priority levels of criteria under the tenets and the severity levels of the rulesets.

18. A non-transitory processor-readable storage medium comprising machine-readable instructions that cause a processor to:

receive results from executing a plurality of tests on an application, wherein the plurality of tests test the application on tenets including security, compliance, compatibility and performance;

select one or more rulesets corresponding to criteria under each of the tenets, wherein the rulesets are selected based at least on a classification associated with the application;

determine outputs of the plurality of tests on the application, wherein the outputs indicate if the application has passed or failed each of the plurality of tests based at least on applying the rulesets to the results;

calculate an application trust score for the application based on the results, weightage of each of the tenets for the application, priority levels of the criteria and severity levels of the rulesets;

identify a position for the application on a scoring scale based on the application trust score, the position of the application being relative to a pair of trust threshold values and the position corresponds to a configured categorization of the application into one of a plurality of trust categories that include safe, potentially vulnerable and vulnerable; and receive feedback regarding the configured categorization of the application, wherein:

if the feedback is not the same as the configured categorization, provide the feedback to a trained feedforward neural network that adjusts one or more of the pair of trust threshold values associated with the application on the scoring scale by:

for each of the rulesets implemented for the application, accessing historical data that includes categorizations provided by reviewers for a plurality of other applications;

identifying from the historical data, severity levels of another application that implements the rulesets and the other application has same categorization in the historical data as the categorization of the application in the feedback; and adjusting the severity levels of the rulesets for the application to have identical values as the severity levels of the other application as given in the historical data;

and if the feedback is the same as the configured categorization, initiate an automatic action; and generate a report regarding the categorization of the application as provided in the feedback.

19. The non-transitory processor-readable storage medium of claim 18, the instructions to execute the automatic action cause the processor to:

upload the application to a publication database if the application is positioned above an upper trust threshold value of the pair of trust threshold values on the scoring scale;

categorize the application for further analysis and development if the application is positioned below the upper trust threshold value and above a lower trust threshold value of the pair of trust threshold values on the scoring scale; and reject the application if the application is positioned below the lower trust threshold value on the scoring scale.

* * * * *